United States Patent
Sato et al.

(10) Patent No.: US 10,129,466 B2
(45) Date of Patent: Nov. 13, 2018

(54) IMAGE GENERATING APPARATUS, IMAGE GENERATING METHOD, AND IMAGE GENERATING PROGRAM

(71) Applicant: CANON KABUSHIKI KAISHA, Tokyo (JP)

(72) Inventors: Masanori Sato, Yokohama (JP); Kazuya Kodama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 15/195,194

(22) Filed: Jun. 28, 2016

(65) Prior Publication Data
US 2017/0013248 A1    Jan. 12, 2017

(30) Foreign Application Priority Data
Jul. 7, 2015  (JP) .................................. 2015-136287

(51) Int. Cl.
| | | |
|---|---|---|
| *H04N 13/00* | (2018.01) | |
| *H04N 5/232* | (2006.01) | |
| *G02B 27/00* | (2006.01) | |
| *G02B 21/36* | (2006.01) | |
| *G06T 5/00* | (2006.01) | |
| *G06T 7/557* | (2017.01) | |

(52) U.S. Cl.
CPC ....... *H04N 5/23235* (2013.01); *G02B 21/367* (2013.01); *G02B 27/0075* (2013.01); *G06T 5/003* (2013.01); *G06T 7/557* (2017.01); *G06T 2207/10052* (2013.01)

(58) Field of Classification Search
CPC . H04N 13/00; H04N 13/0018; H04N 13/0022
See application file for complete search history.

(56) References Cited

U.S. PATENT DOCUMENTS

| 5,835,135 A * | 11/1998 | Hamaguri ................. H01J 9/42 348/191 |
| 9,874,749 B2 * | 1/2018 | Bradski ................ G02B 27/017 |
| 2014/0098213 A1 | 4/2014 | Sato et al. |

OTHER PUBLICATIONS

Ou, Xi et al., "Efficient Free Viewpoint Image Acquisition From Multiple Differently Focused Images", Visual Communications and Images Processing, 2008, SPIE vol. 6822-73, pp. 682221-1-682221-8.

(Continued)

*Primary Examiner* — Jonathan R Messmore
(74) *Attorney, Agent, or Firm* — Fitzpatrick, Cella, Harper & Scinto

(57) ABSTRACT

An image generating apparatus includes: an input unit that inputs data on a defocused image group; a storage unit that stores data on a plurality of filters generated based on a three-dimensional blur function; and a computing unit that generates a new image by applying the filter to the defocused image group. When a first element of a first filter out of the plurality of filters is symmetrical or anti-symmetrical with a second element included in the first filter or a second filter, which is different from the first filter, the storage unit does not store the data on the first element, and the computing unit generates the data on the first element of the first filter based on data on the second element which is stored in the storage unit when the first filter is used.

20 Claims, 27 Drawing Sheets

(56) References Cited

OTHER PUBLICATIONS

Kodama, Kazuya and Kubota, Akira, "Efficient Reconstruction of All-in-Focus Images Through Shifted Pinholes from Multi-Focus Images for Dense Light Field Synthesis and Rendering", IEEE Transactions on Image Processing, 2013, vol. 22, No. 11, pp. 4407-4421.

* cited by examiner

IMAGE GENERATING APPARATUS, IMAGE GENERATING METHOD, AND IMAGE GENERATING PROGRAM

BACKGROUND OF THE INVENTION

Field of the Invention

The present invention relates to an image generating apparatus and an image generating method.

Description of the Related Art

Currently an image generating method using light field rendering is progressing. According to this method, information on light in many directions in a three-dimensional space is recorded, and various images are generated by combining this information with image processing. A light field camera was implemented using this technique. In a light field camera, many micro-lens arrays are disposed between the lens and an image sensor, for example, so as to record information on light from many directions. An advantage of this light field camera is that the user can freely set a blur amount and a focus of a photograph after imaging. However, compared with a standard camera, image quality is not very good.

On the other hand, Non-patent literature (NPL) 1, for example, a method for generating an image equivalent to that of the light field camera using a standard digital camera and the like was disclosed. According to this method, a defocused image group is acquired by imaging one object with changing a focus, and a position-invariant linear filter processing is performed on the image group, whereby each image having a different view point, blur amount, blur shape and focus can be generated. According to this method, an image is generated by a simple filter processing without performing complicated determination processing that considers where and how a blur occurred, hence a desired image can be stably generated. In this method, a position-invariant three-dimensional blur function must be provided for approximating the blur characteristic of the imaging optical system, but even if the provided three-dimensional blur function and actual blur characteristic deviate for any reason, it is known that a major problem does not occur to the generated image. This characteristic makes it possible to generate high quality images simply and stably. The final image generated like this is hereafter called a "reconstructed image". And the processing of generating the reconstructed image is called "image reconstruction".

[NPL 1] Kazuya Kodama and Akira Kubota: "Efficient Reconstruction of All-in-Focus Images Through Shifted Pinholes from Multi-Focus Images for Dense Light Field Synthesis and Rendering", IEEE Transactions on Image Processing, vol. 22, No. 11, pp. 4407-4421 (2013).

[NPL 2] Xi Ou, Takayuki Hamamoto, Akira Kubota, and Kazuya Kodama: "Efficient Free Viewpoint Image Acquisition From Multiple Differently Focused Images", Visual Communications and Image Processing 2008 (VCIP 2008), SPIE Vol. 6822-73 (2008).

SUMMARY OF THE INVENTION

A problem of the method disclosed in NPL1, however, is that in some cases the computing amount and memory consumption required for image construction may increase. Therefore occasionally satisfying the processing speed may not be acquired depending on the performance of the computer in the execution environment, or an image having a desired image quality may not be acquired due to the limits of available memory.

To solve this problem, it is an object of the present invention to provide an image generating apparatus and an image generating method that can reduce the computing amount and memory consumption without dropping the image quality of the generated image, thereby images can be reconstructed more easily.

The present invention in its first aspect provides an image generating apparatus, comprising: an input unit configured to input data on a defocused image group constituted by a plurality of images acquired by imaging an object for a plurality of times while changing a focal position in an optical axis direction of an imaging optical system; a storage unit configured to store data on a plurality of filters generated on the basis of a three-dimensional blur function for approximating a blur characteristic of the imaging optical system; and a computing unit configured to acquire data on a filter to be used from the storage unit and to generate a new image by applying the filter to the defocused image group, wherein when a first element of a first filter out of the plurality of filters is symmetrical or anti-symmetrical with a second element included in the first filter or a second filter, which is different from the first filter, the storage unit does not store the data on the first element of the first filter, and the computing unit generates the data on the first element of the first filter on the basis of data on the second element which is stored in the storage unit when the first filter is used.

The present invention in its second aspect provides an image generating method, comprising: a step in which a computer inputs data on a defocused image group constituted by a plurality of images acquired by imaging an object for a plurality of times while changing a focal position in an optical axis direction of an imaging optical system; and a computing step in which the computer acquires data on a filter to be used from a storage unit, which stores data on a plurality of filters generated on the basis of a three-dimensional blur function for approximating a blur characteristic of the imaging optical system, and generates a new image by applying the filter to the defocused image group, wherein when a first element of a first filter out of the plurality of filters is symmetrical or anti-symmetrical with a second element that is included in the first filter or a second filter, which is different from the first filter, the storage unit does not store the data on the first element of the first filter, and in the computing step, the data on the first element of the first filter is generated on the basis of data on the second element, which is stored in the storage unit, when the first filter is used.

The present invention in its third aspect provides a non-transitory computer readable storage medium storing a program causing a computer to execute: a step of inputting data on a defocused image group constituted by a plurality of images acquired by imaging an object for a plurality of times while changing a focal position in an optical axis direction of an imaging optical system; and a computing step of acquiring data on a filter to be used from a storage unit storing data on a plurality of filters generated on the basis of a three-dimensional blur function for approximating a blur characteristic of the imaging optical system, and generating a new image by applying the filter to the defocused image group, wherein when a first element of a first filter out of the plurality of filters is symmetrical or anti-symmetrical with a second element included in the first filter or a second filter, which is different from the first filter, the storage unit does not store the data on the first element of the first filter, and in the computing step, the data on the first element of the first filter is generated on the basis of data on the second element, which is stored in the storage unit, when the first filter is used.

According to the present invention, the computing amount and memory consumption can be reduced in the method disclosed in NPL1, for example, without dropping the image quality of the reconstructed image. Thereby the desired reconstructed image can be generated easily, even if a computer with lower processing performance is used.

Further features of the present invention will become apparent from the following description of exemplary embodiments with reference to the attached drawings.

DESCRIPTION OF THE EMBODIMENTS

An image generating apparatus and an image generating method according to an embodiment of the present invention will now be described with reference to the drawings.

<Embodiment 1>

An image generating system according to Embodiment 1 will be described with reference to the drawings. The method disclosed in this embodiment is implemented under a system configuration shown in FIG. 1. 101 denotes an image input apparatus which corresponds to an apparatus having an image pickup element, such as a camera, but in this embodiment, a microscope system, equipped with an imaging apparatus, is used as the image input apparatus 101. A detailed internal configuration thereof will be described later. 102 denotes an image generating apparatus which is a major component to implement the method disclosed in this embodiment. In concrete terms, the image generating apparatus 102 receives image data acquired by the image input apparatus 101, and generates display image data. 103 denotes an image display apparatus, and displays the image based on the display image data received from the image generating apparatus 102.

Figure 1:
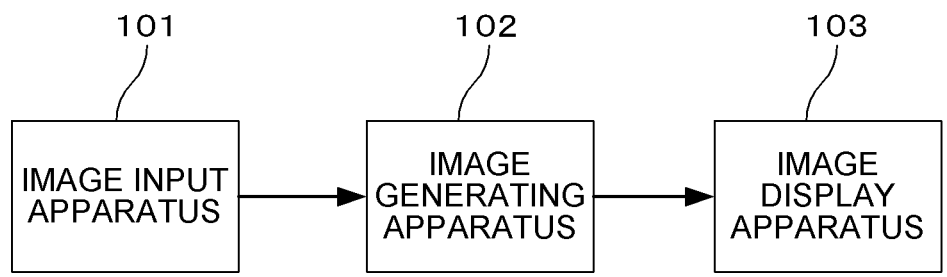
FIG. 1 is a system block diagram of an image generating system of Embodiment 1.

The description on FIG. 1 is now completed.

Figure 2:
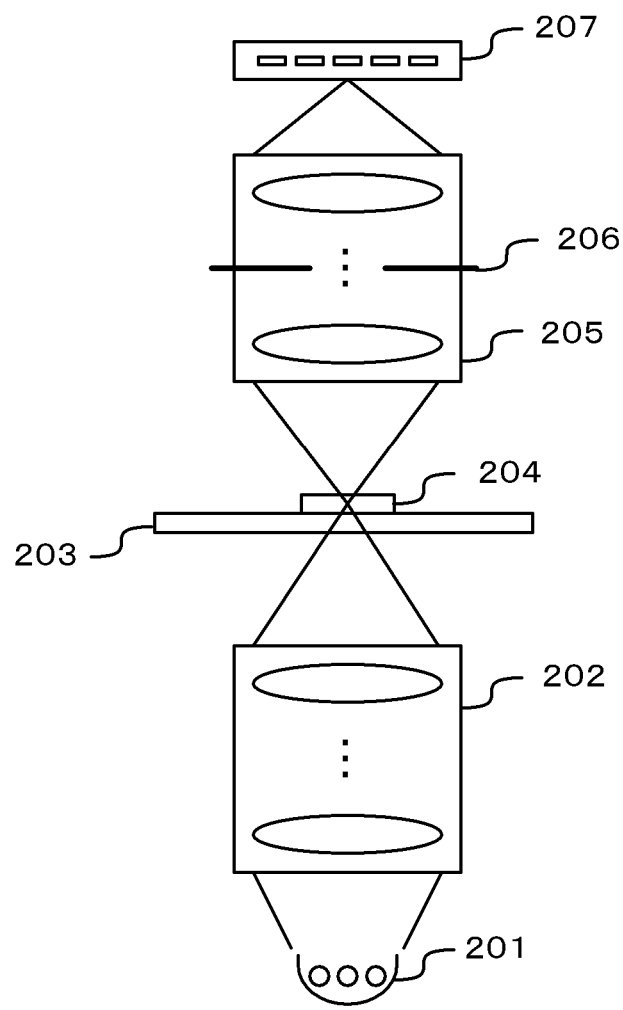
FIG. 2 is a diagram depicting an internal configuration of an image input apparatus of Embodiment 1.

FIG. 2 is a diagram depicting an internal configuration of the image input apparatus 101 according to this embodiment.

Light of a light source 201 becomes uniform so that an unevenness of light quantity is not generated, and is irradiated, through an illumination optical system 202, onto a slide (also called "preparation") 204 that is set on a stage 203. The slide 204 is prepared to make a specimen (object) observable by attaching a slice of an observation target tissue to or a cell smear on a slide glass, and fixing the slide glass, along with an encapsulant, under a cover glass.

an imaging optical system 205 enlarges the image of the specimen and guides the image to an imaging unit 207, which is an imaging means. The light that passed through the slide 204 forms an image on an imaging surface on the imaging unit 207 via the imaging optical system 205. An aperture stop 206 exists in the imaging optical system 205, and the depth of field can be controlled by adjusting the aperture stop 206.

When the specimen is imaged, the light source 201 is turned ON, and light is irradiated onto the slide 204. The light transmits through the illumination optical system 202, the slide 204 and the imaging optical system 205, forms an image on the imaging surface, and an image sensor in the imaging unit 207 receives the image. When monochrome (grayscale) imaging is performed, the specimen is exposed by white light from the light source 201, and imaging is executed once. When color imaging is performed, the specimen is exposed sequentially by light from three light sources (R, G and B) 201, and imaging is performed three times, whereby a color image is acquired. It is also possible to expose the specimen by white light from the light source 201, perform wavelength dispersion using such an optical system as a dichroic prism, and collectively acquire images having different wavelengths by a plurality of image sensors.

The image of the specimen formed on the imaging surface is photoelectrically converted by the imaging unit 207, is A/D converted, and then sent to the image generating apparatus 102 as electric signals. In this embodiment, it is assumed that the development processing represented by noise removal, color conversion processing and sharpening processing after executing A/D conversion is internally performed in the image generating apparatus 102. However it is also possible that the development processing is performed by a dedicated image processing unit (not illustrated) connected to the imaging unit 207, with data then sent to the image generating apparatus 102, and this possible mode is also included in the scope of the present invention.

In this description, an image group acquired by imaging a same object for a plurality of times using the image input apparatus 101, while changing the focal position in the optical axis direction (in other words, a plurality of images of the object having different blurs) is called a "defocused image group" or "Z stack images").

The description on FIG. 2 is now completed.

In this embodiment, the image generating apparatus 102 can be implemented by a computer having the hardware configuration shown in FIG. 3 and later mentioned programs to provide various functions, for example. 301 denotes an input unit, which corresponds to a keyboard, a mouse and the like. 302 denotes a storage unit which stores programs to implement the method disclosed in this embodiment and processing target data, and corresponds to a RAM, for example. 303 denotes a computing unit, which performs various computing processing operations of the data stored in the storage unit 302 according to the programs stored in the storage unit 302, and corresponds to a processor such as a CPU. It is even better if a high-speed processor, such as a graphics processing unit (GPU), is used for the computing unit 303. 304 denotes an I/F unit, and is an interface unit that controls data input/output with the image input apparatus 101 and the image display apparatus 103. 305 denotes an external storage device (or auxiliary storage device), and corresponds to a hard disk, a flash memory and the like. 306 denotes a data bus that connects the above components 301 to 305. If the defocused image groups is already stored in the external storage device 305, the image input apparatus 101 is not always necessary.

Figure 3:
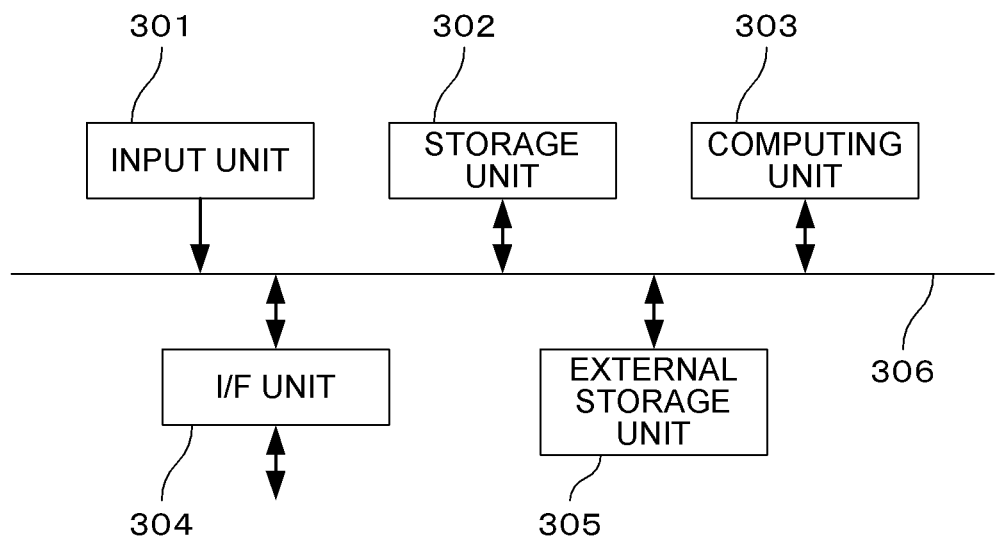
FIG. 3 is a hardware block diagram of an image generating apparatus of Embodiment 1.

The description on FIG. 3 is not completed.

Figure 4:
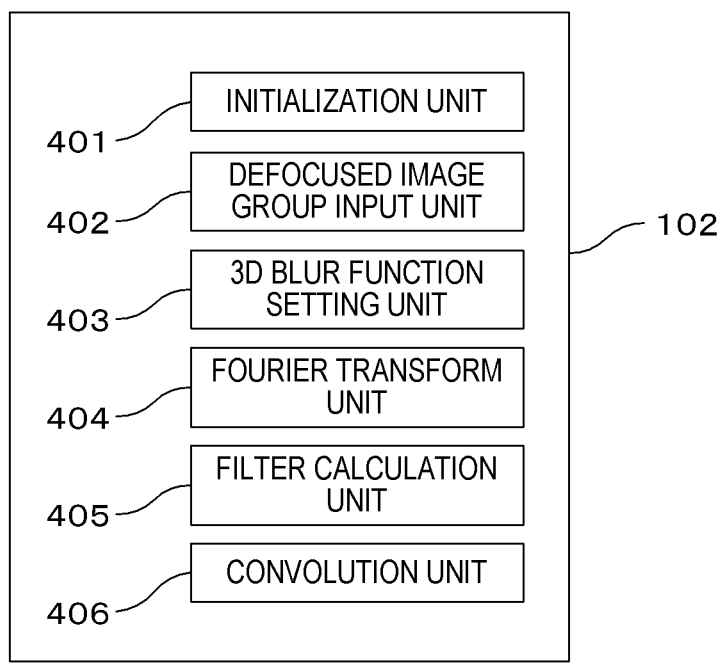
FIG. 4 is a functional block diagram of the image generating apparatus of Embodiment 1.

FIG. 4 shows a functional block diagram of the image generating apparatus 102 according to this embodiment. The functional blocks 401 to 406 shown in FIG. 4 are implemented by the computing unit 303 executing required programs. 401 denotes an initialization unit that performs various initialization steps required for the processing of this embodiment. 402 denotes a defocused image group input unit that inputs data on a defocused image group to be processed. 403 denotes a three-dimensional blur function setting unit that sets a shape of the three-dimensional blur function to be used for the processing. 404 denotes a Fourier transform unit that performs Fourier transform/inverse Fourier transform for a defocused image group or reconstructed image, and performs Fourier transform/inverse Fourier transform for the three-dimensional blur function when necessary. 405 denotes a filter calculation unit that performs calculation for the filter that is required for the processing. 406 denotes a convolution unit that performs convolutional operation of the defocused image group and filter in the frequency space. In this embodiment, Fourier transform is used as the frequency analysis method, but other frequency analysis methods (e.g. sine transform, cosine transform) may be used.

The description on FIG. 4 is now completed.

(Depth Control Processing of NPL1)

Prior to describing this embodiment in detail, the depth control processing, to which the embodiment is applied, will be described. The depth control processing is the processing described in NPL1, and is an image reconstruction processing for generating an image by changing the view point, blur amount, blur shape and focus of the defocused image group.

Figure 5:
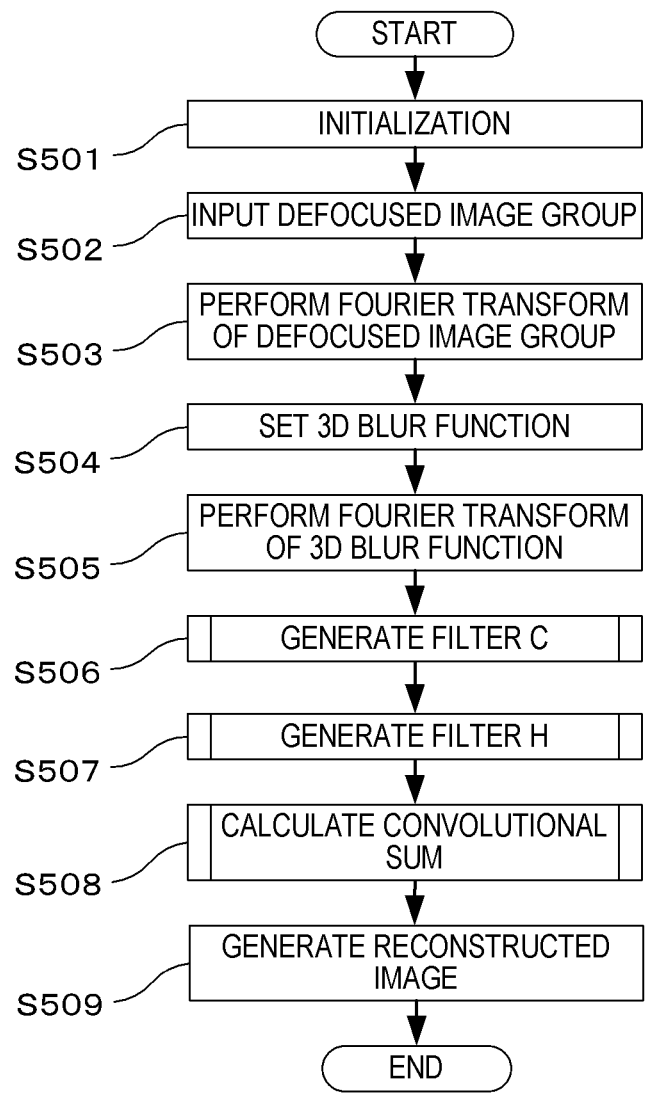
FIG. 5 is a flow chart depicting a flow of depth control processing of NPL1.

FIG. 5 is a flow chart depicting a general flow of the depth control processing described in NPL1. The processing flow will be described with reference to FIG. 5.

First the initialization unit 401 performs the initial setting (step S501). In this step, the variables required for the depth control processing are defined and memory regions are secured, for example.

In step S502, the defocused image group input unit 402 inputs a defocused image group. In this step, "input" refers to storing the data on the defocused image group to be processed to the storage unit 302. The defocused image group input unit 402 may acquire the data from the image input apparatus 101, or may read the data, which is stored in the external storage device 305 in advance, in the storage unit 302. Further, the data on the defocused image group may be acquired from an image server or network storage (neither illustrated) via a network. In this embodiment, it is assumed that the defocused image group is constituted by N number of defocused images, and a total number of pixels of each image is $N_x \times N_y$ pixels ($N_x$ is a number of pixels in the horizontal direction, and $N_y$ is a number of pixels in the vertical direction). It is preferable that $N_x$ and $N_y$ are set to numbers expressed by a power of 2, for example. Then a fast Fourier transform (FFT) can be applied to the Fourier transform in subsequent steps, which means that faster calculation can be expected. Still further, it is assumed that each pixel of the image is constituted by three components (red, green, blue), and 1 [byte] is allocated to each component in one pixel in memory. As a consequence, the total memory usage of the defocused image group can be calculated as $N_x \times N_y \times 3 \times N$ [bytes].

In step S503, the Fourier transform unit 404 performs Fourier transform for the input defocused image group. The Fourier transform unit 404 applies two-dimensional Fourier transform to each of the N number of defocused images stored in the storage unit 302. The result of the Fourier transform is also stored in the storage unit 302. This means that after this step completes, N sets of array data, which represent the frequency characteristic of each image constituting the defocused image group, are stored in the storage unit 302. Hereafter this array data is expressed as $G^{(n)}(u, v)$. Normally $G^{(n)}(u, v)$ is a complex number array, hence the total number of data thereof is $N_x \times N_y \times 3 \times N \times 2$. u and v are frequency space coordinate axes corresponding to x and y, which are the coordinates axes of a real space. Unless otherwise specified, it is assumed that a domain of u is $-N_x/2 \le u < N_x/2$, and a domain of v is $-N_y/2 \le v < N_y/2$. n denotes an image number (number of focal position), and is n=0 to N−1, for example, if a number of images is N.

In step S504, the three-dimensional blur function setting unit 403 sets a three-dimensional blur function. The three-dimensional blur function is information on a three-dimensional blur in the defocused image group to be processed, in other words, information on a blur characteristics (imaging characteristic) of the imaging optical system used for imaging of the defocused image group. For example, the PSF (Point Spread Function) of the imaging optical system can be used. The three-dimensional blur function need not exactly match the characteristic of the imaging optical system used for actual imaging, but may be sufficient if the characteristic of the imaging optical system is approximately represented. If the characteristic of the imaging optical system used for imaging the defocused image group is unknown, a standard three-dimensional blur function may be used.

The data on the three-dimensional blur function may be written in program code in advance, or the shape of the three-dimensional blur function may be changed by an external input and stored in the storage unit 302. For example, the three-dimensional blur function setting unit 403 may change the shape of the three-dimensional blur function by acquiring parameters required for setting the three-dimensional blur function from the image input apparatus 101, or by acquiring parameters from user input via the input unit 301.

In step S505, the Fourier transform unit 404 performs Fourier transform for the data representing the three-dimensional blur function. The Fourier transform in this step refers to the processing of converting the three-dimensional blur function h (x, y, z) in the real space into frequency space data, and calculating a new function H (u, v, z), as shown in the following expressions. Note that Fourier transform is executed only for the x and y directions, and not for the z direction.

$$H(u, v, z) = \int\int h(x, y, z)\exp(-iux)\exp(-ivy)dxdy \quad (1)$$

$$H(u, v, z) = \sum_{x=0}^{N_x-1} \sum_{y=0}^{N_y-1} h(x, y, z)\exp\left(-2\pi i\left(\frac{ux}{N_x} + \frac{vy}{N_y}\right)\right) \quad (2)$$

Expression (1) is used when the three-dimensional blur function h (x, y, z) has already been provided based on analysis, and in this case, the acquired analytic H (u, v, z) is converted into array data and stored in the storage unit 302. Expression (2) is used when the three-dimensional blur function h (x, y, z) has already been stored in the storage unit 302 as array data. i is an imaginary unit.

The processing operations in steps S504 and S505 may be replaced with the processing of acquiring data of Fourier transform H (u, v, z) of the three-dimensional blur function which the three-dimensional blur function setting unit 403 provided in advance. In this case, Fourier transform H (u, v, z) of the three-dimensional blur function, that is expected to be used, is analytically determined in advance using Expression (1), and the result thereof is written in program code or stored as array data in the storage unit 302.

In step S506, the filter calculation unit 405 generates a filter $C_{s,t}$ (u, v) from the Fourier transform H (u, v, z) of the three-dimensional blur function. In concrete terms, the calculation is performed using the following expression.

$$C_{s,t}(u, v) = \sum_{z} H(u, v, z)\exp\left(-2\pi i\left(\frac{su}{N_x} + \frac{tv}{N_y}\right)z\right) \quad (3)$$

Figure 6:
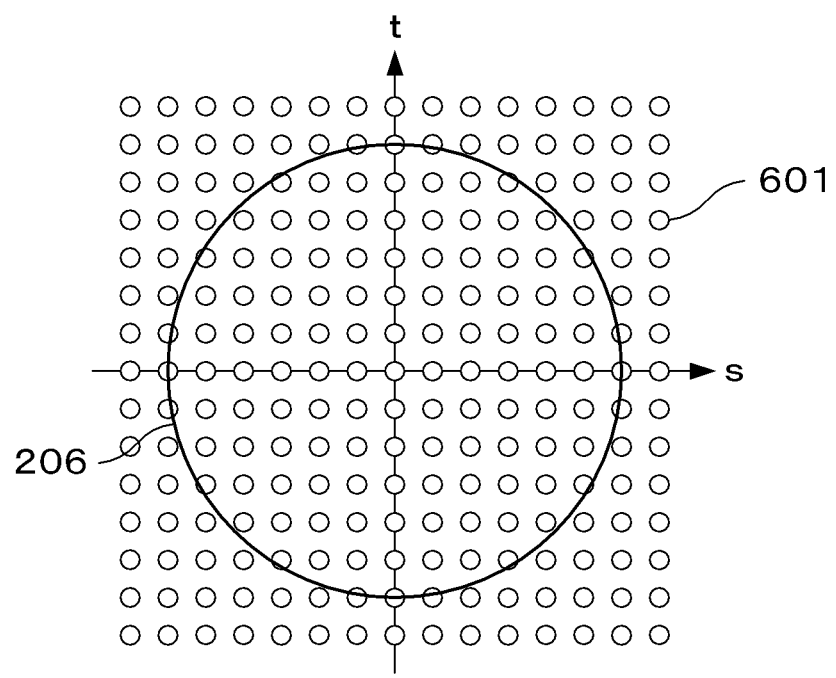
FIG. 6 is a schematic diagram of an (s, t) coordinate system of NPL1.

Here s and t are values for specifying the view point and the rays of the light field, and in this embodiment, s indicates the horizontal coordinate on the surface of the aperture stop 206, and t indicates the vertical coordinate thereon. The origin (s, t)=(0, 0) is an intersection of the aperture stop 206 and the optical axis of the imaging optical system 205. Hereafter the two-dimensional coordinate system expressed by s and t is called an "(s, t) space" or "(s, t) coordinate system". The (s, t) coordinate system is a plane perpendicular to the optical axis direction. The (s, t) coordinate system is discretized, and FIG. 6 shows a schematic diagram thereof. 601 indicates a discrete point (corresponds to a view point) in the (s, t) coordinate system, and a number of discrete points is low if discretization is coarse, and is high if discretization is fine. The filter $C_{s,t}$ (u, v) is generated for each discretization point. In FIG. 6, the (s, t) space is discretized based on the orthogonal coordinate system with equal intervals, but if necessary, a discretization that is different from FIG. 6 may be performed, such as using a polar coordinate system. The possible values of s and t differ depending on the discretization of the (s, t) space. For example, if the domain of the (s, t) space is $-1 \le s \le 1$ and $-1 \le t \le 1$, and if discretization is performed by equally dividing the domain in each axis direction into three, then the possible values of s and t are both three values: −1, 0 and 1. In this case, by combining these values, the (s, t) space is discretized to nine points: (s, t)=(−1, −1), (0, −1), (1, −1), (−1, 0), (0, 0), (1, 0), (−1, 1), (0, 1) and (1, 1). As the discretization becomes finer the memory consumption of the storage unit 302 increases, but the image quality of the final reconstructed image improves.

$C_{s,t}$ (u, v) is a filter for extracting information related to rays that pass through the view point (s, t), out of the defocused image group, and is also called a "ray separation filter". $C_{s,t}$ (u, v) of this embodiment is a two-dimensional spatial frequency filter that is used in the frequency space. Hereafter $C_{s,t}$ (u, v) is also referred to as "filter C" to simplify description.

If a total number of discrete points (s, t) is M, then filter C is constituted by M number of filters. Each filter has $N_x \times N_y$ number of elements, and each element is a complex number data. Therefore a total memory consumption of the filter C becomes $N_x \times N_y \times 2 \times M \times 4$ [bytes] if the real part and imaginary part of the complex number are expressed by single-precision floating points, and becomes $N_x \times N_y \times 2 \times M \times 8$ [bytes] if the real part and the imaginary part are expressed by double-precision floating points. In practical terms, the reconstructed image to be generated is not affected even if the single-precision floating point is used. Hence the single-precision floating point is used as data format to store the filter C. This configuration has an advantage when this embodiment is applied to a GPU, for example.

Figure 7:
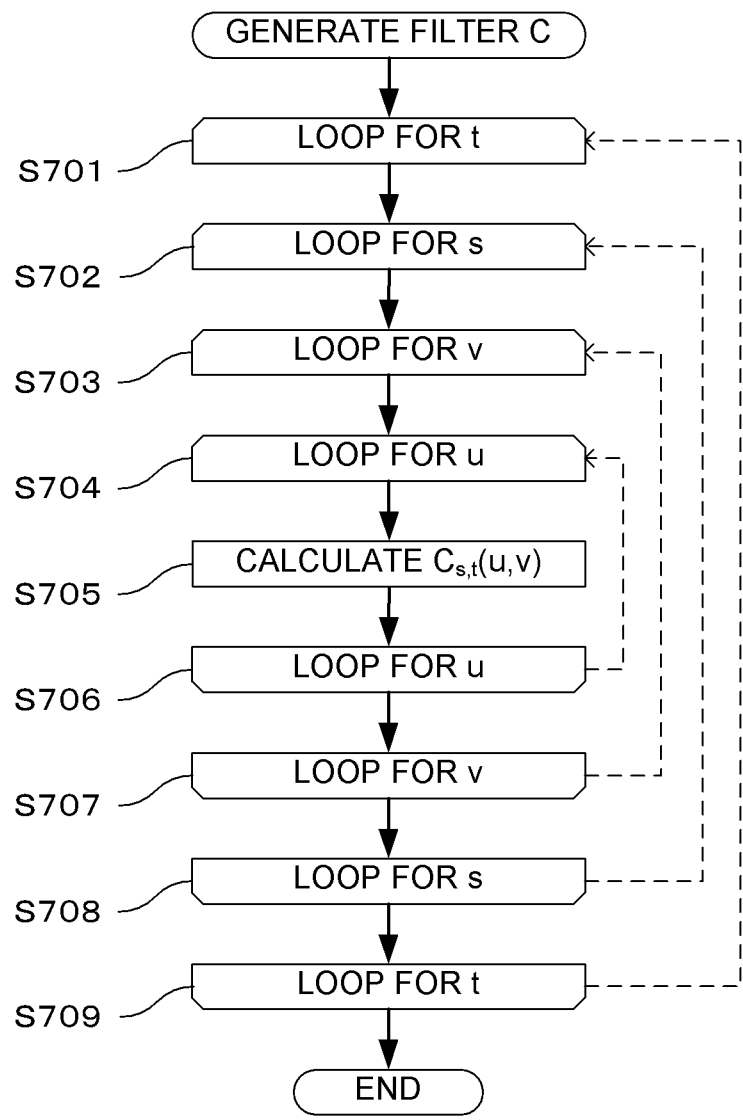
FIG. 7 is a flow chart depicting a flow of a filter C generating processing of NPL1.

FIG. 7 shows details of the processing flow in step S506. The filter calculation unit 405 performs loop processing for the variables s, t, u and v respectively, and calculates the value of each element (u, v) of the filter C corresponding to each discrete point (s, t) (step S701 to S709). In step S705, Expression (3) is calculated.

In step S507, the filter calculation unit 405 generates the filter $H^{(n)}$ (u, v) from the filter $C_{s,t}$ (u, v). The filter $H^{(n)}$ (u, v) is a filter for generating a reconstructed image having a new blue effect from the defocused image group, and is also called a "blur reconstruction filter". In concrete terms, the filter $H^{(n)}$ (u, v) is calculated according to the following expression.

$$H^{(n)}(u, v) = \sum_{s,t} l(s, t) \exp\left(-2\pi i \left(\frac{su}{N_x} + \frac{tv}{N_y}\right)(n - n_f)\right) C_{s,t}(u, v)^{-1} \quad (4)$$

Here l(s,t) denotes a coefficient to determine a shape of a new blur that is applied to the reconstructed image, and can be set by the user. $n_f$ denotes an integer that indicates the focusing position (in-focus position), and is $0 \leq n_f \leq N-1$. The focusing position $n_f$ can also be set by the user. To simplify description, $H^{(n)}$ (u, v) is also called "filter H" (note that this H is not the Fourier transform H (u, v, z) of the three-dimensional blur function h (x, y, z)).

The view point can be changed by special defocusing and focusing. For example, a number of elements l(s, t) that represents a defocus shape after the image is reconstructed is the same as a total number M of the discrete points (s, t), but if 1 is set to one element of l(s, t) and 0 is set to the remaining M−1 number of elements, then an image viewed from a specific view point can be reconstructed. If 1 is set only to a different element, the view point of the reconstructed image can be changed accordingly.

The filter H is constituted by N number of two-dimensional spatial frequency filters corresponding to each focal position n. Each filter has $N_x \times N_y$ number of elements, and each element is complex number data. Therefore the total memory consumption of the filter H is $N_x \times N_y \times 2 \times N \times 4$ [bytes] if the real part and the imaginary part of the complex number are expressed by single-precision floating points, and becomes $N_x \times N_y \times 2 \times N \times 8$ [bytes] if the real part and the imaginary part are expressed by double-precision floating points. In practical terms, the reconstructed image to be generated is not affected even if a single-precision floating point is used. Hence the single-precision floating point is used as data format to store the filter H, just like the case of the filter C. This configuration has an advantage when this embodiment is applied to a GPU, for example. This is also the same as the case of the filter C.

Figure 8:
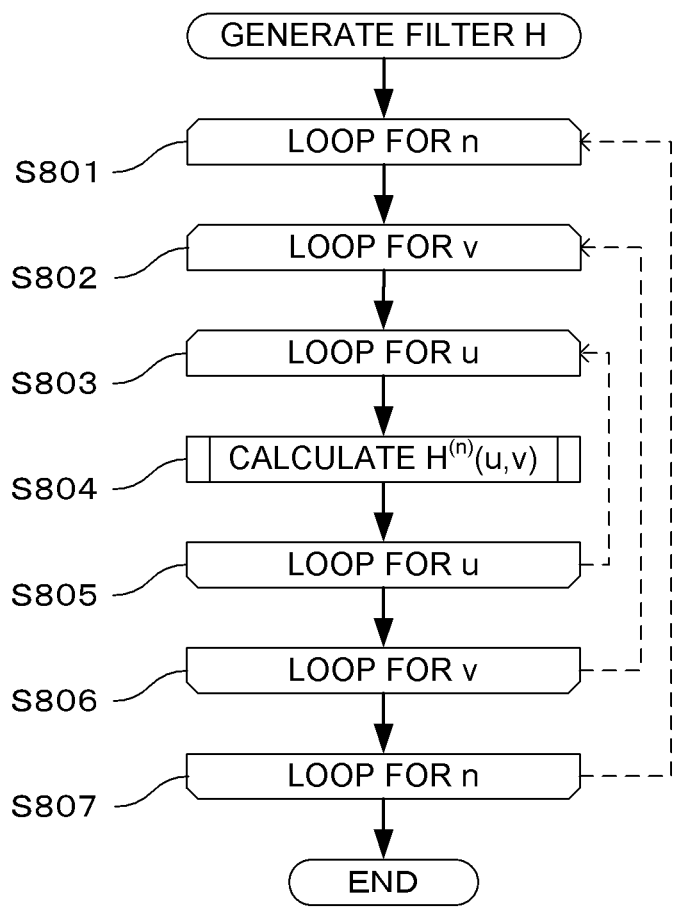
FIG. 8 is a flow chart depicting a flow of a filter H generating processing of NPL1.

FIG. 8 shows details of the processing flow in step S507. The filter calculation unit 405 performs loop processing for the variables n, u and v respectively, and calculates a value of each element (u, v) of the filter H corresponding to each focal position n (steps S801 to S807). In step S804, Expression (4) is calculated.

Thus far the processing content for the defocused image group and the processing content for the filters based on the three-dimensional blur function were described, and no problem arises if the order sequence of these processing operations is reversed. Specifically in this embodiment, steps S504 to S507 are executed after steps S502 and S503, but the steps S502 and S503 may be executed after the steps S504 to S507. Note however that the processing sequence of steps S502 and S503 and the processing sequence of steps S504 to S507 cannot be changed.

In step S508, the convolution unit 406 calculates the convolutional sum of $G^{(n)}$ (u, v) and the filter $H^{(n)}$ (u, v), and determines the reconstructed image A (u, v) in the frequency space. This computation is expressed by the following expression.

$$A(u, v) = \sum_{n=0}^{N-1} G^{(n)}(u, v) H^{(n)}(u, v) \quad (5)$$

Figure 9:
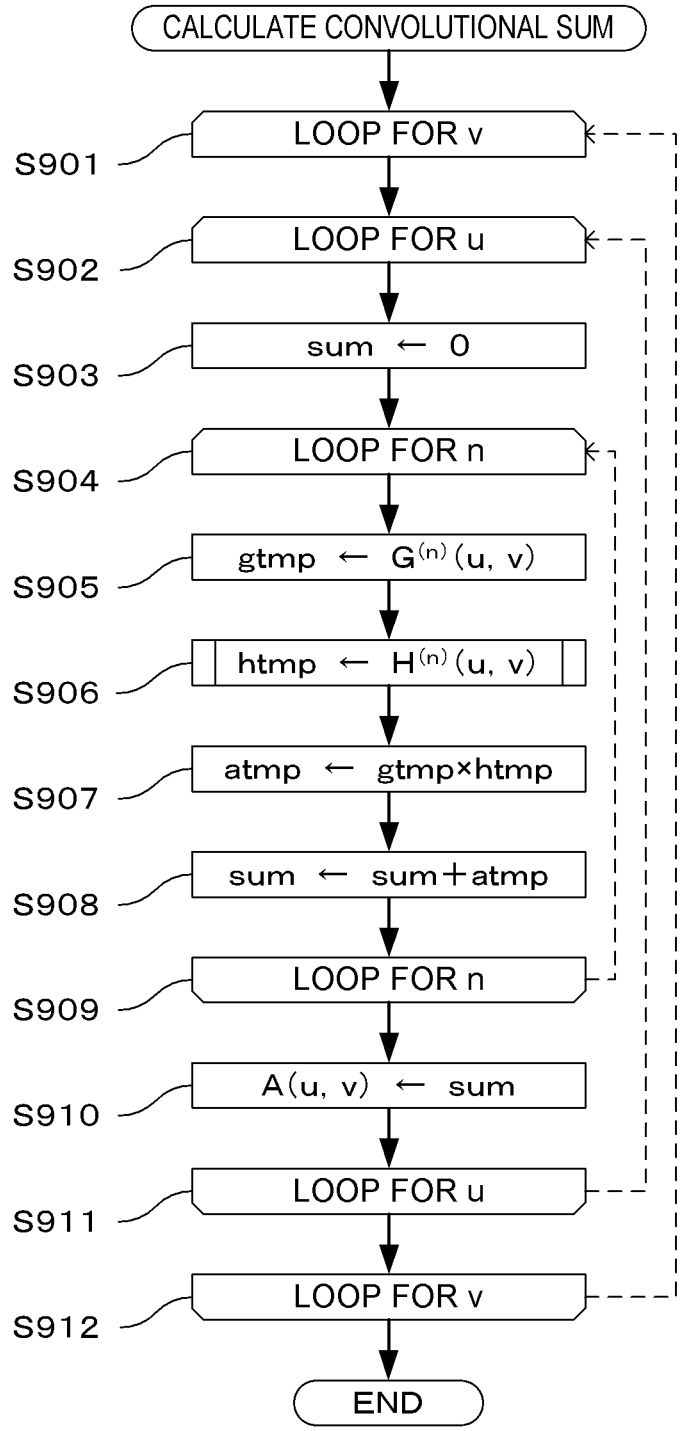
FIG. 9 is a flow chart depicting a flow of a convolutional sum calculating processing of NPL1.

FIG. 9 shows details of the processing flow in step S508. In step S903, the variable sum is initialized to 0. Then the array data $G^{(n)}$ (u, v), which represents the frequency characteristic of the n-th image, is substituted for the variable gtmp, and the filter $H^{(n)}$ (u, v), to be used for the n-th image, is substituted for the variable htmp respectively (steps S905 and S906). The filter $H^{(n)}$ (u, v) is the result of the calculation in step S804. Then atmp, which is a product of gtmp and htmp, is cumulatively added to the sum (steps S907 and S908). By repeating steps S905 to S908 for 0 to (N−1)th images (steps S904, S909), a value A (u, v) corresponding to the coordinates (u, v) on the frequency space is determined (step S910). By executing the calculation of steps S903 to S910 for all the coordinates (u, v) (steps S901, S902, S911, S912), the reconstructed image in the frequency space is acquired.

Finally the Fourier transform unit 404 performs inverse Fourier transform for the reconstructed image A (u, v) in the frequency space, and calculates the reconstructed image a (x, y) in the real space (step S509), and this series of processing ends. This computation is expressed by the following expression.

$$a(x, y) = \frac{1}{N_x N_y} \sum_{u=0}^{N_x-1} \sum_{v=0}^{N_y-1} A(u, v) \exp\left(2\pi i \left(\frac{ux}{N_x} + \frac{vy}{N_y}\right)\right) \quad (6)$$

The final reconstructed image that is determined may be sent directly to the image display apparatus 103 and displayed, or may be stored in the storage unit 302 temporarily, without being sent to the image display apparatus 103, and addition processing may be applied to the image.

To continuously generate and display an image of which blur effect l is changed or an image of which focusing position is changed, steps S507 to S509 can be repeated while omitting steps S501 to S506. By omitting the Fourier transform processing of the three-dimensional blur function and calculation of the filter C, reconstructed images can be generated at high-speed.

The above is the algorithm proposed in NPL1. As mentioned, if the filter C is calculated and stored for all the elements (u, v) of all possible view points (s, t) that are expected, and the filter H is calculated and stored for all the elements (u, v) of all focal positions, then the computing amount and memory consumption of the filter becomes enormous. Therefore the present inventors proposed an improved algorithm to reduce the computing amount and memory consumption of the filter by focusing on various symmetries that exist within this algorithm. One basic concept is that if an element of the first filter (first element) is symmetrical or anti-symmetrical with another element of the first filter (second element), then the computing and storing are performed only for the second element, and are not performed for the first element. Another basic concept is that if one or all of the elements of the first filter (first element) is symmetrical or anti-symmetrical with another element of a second filter which is different from the first filter (second element), then only the second element is computed and stored, and the first element is not computed and stored. So when the first filter is used, data of the first filter can be generated (first element is complemented) based on the data of the second element stored in the storage unit 302. The first filter in this case can be either the filter C or filter H. Embodiments 1 to 6, described later in detail, are methods for reducing the computing amount of the filter H, and Embodiments 7 to 13 are methods for reducing the computing amount of the filter C.

(Reduction of Computing Amount Utilizing Symmetry of Filter H)

In Embodiment 1, the computing amount of the filter H and the memory consumption of the filter H in step S507 are reduced using the characteristic that the filter H has symmetry with respect to the center of the focusing position $n_f$. In concrete terms, if the first focal position and the second focal position are symmetrical with respect to the focusing position $n_f$, only the filter H, which is applied to an image corresponding to the second focal position, is computed and stored, and the computing and storing of the filter H, which is applied to an image corresponding to the first focal position, are omitted.

According to Expression (4), if $n-n_f=n'$ ($-n_f \leq n' \leq N-1-n_f$), the following expression is established.

$$H^{(n'+n_f)}(u,v) = \overline{H^{(-n'+n_f)}(u,v)} \quad (7)$$

The over bar at the right side of Expression (7) indicates a complex conjugate. In other words, if the real part of $H^{(n)}$ (u, v) is expressed as Re $[H^{(n)}$ (u, v)] and the imaginary part is expressed as Im $[H^{(n)}$ (u,v)], then the following expressions are established.

$$Re[H^{(n'+n_f)}(u, v)] = Re[H^{(-n'+n_f)}(u,v)] \quad (8)$$

$$Im[H^{(n'+n_f)}(u, v)] = -Im[H^{(-n'+n_f)}(u, v)] \quad (9)$$

This means that only if $H^{(n'+n_f)}$ (u, v) is calculated, the real value of $H^{(-n'+n_f)}$ (u, v) can be the value of Re $[H^{(n'+n_f)}$ (u, v)] itself, and the imaginary value can be determined by inverting the sign of Im $[H^{(n'+n_f)}$ (u, v)].

Therefore according to this embodiment, the computing of the filter $H^{(-n'+n_f)}$ (u, v) is omitted in the processing in step S507, and the filter $H^{(-n'+n_f)}$ (u, v) is determined based on the filter $H^{(n'+n_f)}$ (u, v) in the computing in step S508. Thereby the computing amount and memory consumption of the filter H can be reduced. The reduction efficiency differs depending on the value of the focusing position $n_f$, but the reduction efficiency is highest in the case of $n_f=(N-1)/2$ if N is an odd number, and in the case of $n_f=N/2$ if N is an even number. In this case, the reduction efficiency is about ½.

(Filter H Reference Processing when Convolutional Sum is Calculated)

Figure 10:
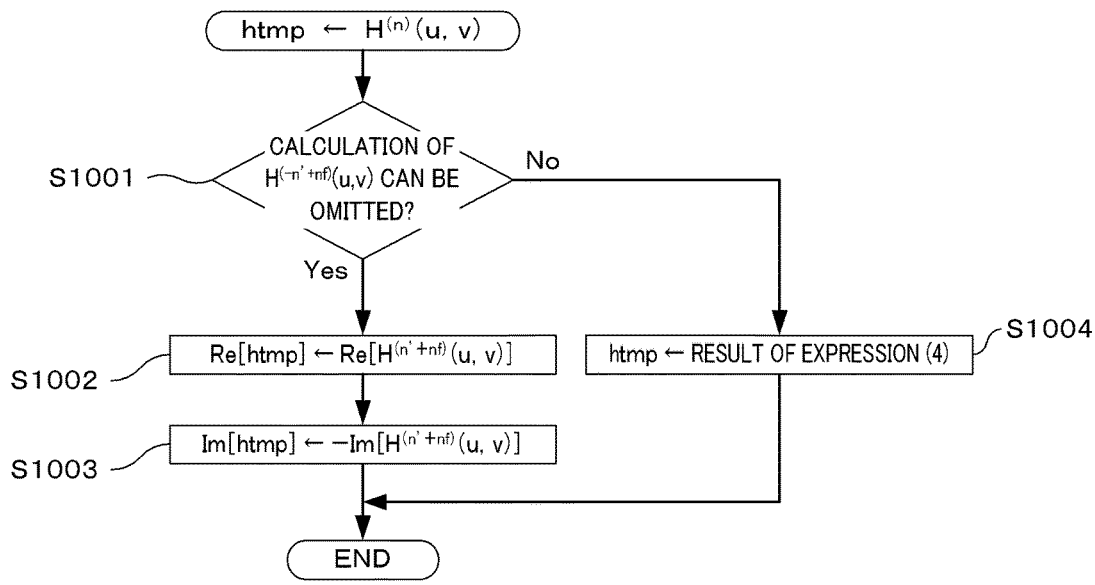
FIG. 10 is a flow chart depicting a filter H value acquiring processing of Embodiment 1.

FIG. 10 shows details of the calculation procedure in step S906 when the above mentioned computing amount reducing processing is applied.

First the convolution unit 406 determines whether the calculation processing of $H^{(-n'+n_f)}$ (u, v) can be omitted (condition determination step S1001). If the result of step S1001 is YES, the convolution unit 406 determines the complex conjugate of $H^{(n'+n_f)}$ (u, v) which has already been stored in the storage unit 302, and substitutes the result for htmp. In other words, the real part of $H^{(n'+n_f)}$ (u, v) is substituted for the real part of htmp (step S1002), and the imaginary part of $H^{(n'+n_f)}$ (u, v), of which sign is inverted, is substituted for the imaginary part of htmp (step S1003). Then the processing in FIG. 10 is completed. If the result of step S1001 is NO, the convolution unit 406 acquires the result of calculation which has already been performed based on Expression (4), from the storage unit 302, substitutes this result for htmp (step S1004), and completes the processing in FIG. 10.

The description on FIG. 10 is now completed.

As described above, according to this embodiment, the computing amount and memory consumption of the method shown in NPL1 are reduced since the shape of the filter H is a complex conjugate with respect to the focusing position $n_f$. The efficiency of the method according to this embodiment is different depending on the value of the focusing position $n_f$, but is about ½ at the maximum. By this reduction effect, a desired reconstructed image can be easily generated, even if a computer with lower processing performance is used.

<Embodiment 2>

Embodiment 2 of the present invention will be described with reference to the drawings. The configuration of the image generating system, the configuration of the image input apparatus, the hardware configuration and functional blocks of the image generating apparatus, and the algorithm of the depth control processing are the same as those of Embodiment 1, but the computing amount reduction method of the filter H is different.

(Computing Amount Reduction by Introducing Constraint)

In this method, when the depth control method described in NPL1 is used, a constraint expressed by the following Expression (10) is imposed on the three-dimensional blur function h (x, y, z).

$$h(x,y,z) = \iint k(s,t)\delta(x+sz, y+tz)dsdt \quad (10)$$

Here k (s, t) denotes a coefficient that represents a weight of a ray group constituting the three-dimensional blur function h (x, y, z), and δ denotes a Dirac delta function. It is assumed that k (s, t) satisfies the following expression.

$$\iint k(s,t)dsdt = 1 \quad (11)$$

The range of z is specified so that the three-dimensional blur function is point symmetrical with respect to the origin (x, y, z)=(0, 0, 0), which is the focusing position. In summary, according to this embodiment, the three-dimensional blur function is constrained to a function that is point symmetrical with respect to the focusing position, and is expressed by a set of rays that pass through the focusing position.

If this constraint is imposed, the imaginary part of each element of the filter $C_{s,t}$ (u, v) becomes zero, and the value of each element of the filter $C_{s,t}$ (u, v) becomes a real number. Further, as shown in the following Expression (12), the filter $C_{s,t}$ (u, v) has point symmetry with respect to the origin (u, v)=(0, 0) regardless the values of s and t (derivation process is omitted).

$$C_{s,t}(u,v) = C_{s,t}(-u,-v) \quad (12)$$

If the result of Expression (12) is applied to Expression (4), the following expression is established.

$$H^{(n)}(-u,-v) = \sum_{s,t} l(s,t)\exp\left(-2\pi i\left(\frac{s(-u)}{N_x} + \frac{t(-v)}{N_y}\right)(n-n_f)\right) \quad (13)$$

$$C_{s,t}(-u,-v)^{-1}$$

$$= \sum_{s,t} l(s,t)\exp\left(2\pi i\left(\frac{(su)}{N_x} + \frac{(tv)}{N_y}\right)(n-n_f)\right)$$

$$C_{s,t}(u,v)^{-1}$$

-continued $$= \overline{H^{(n)}(u, v)}$$

Thereby it is known that Re [$H^{(n)}$ (u, v)] is symmetrical with respect to the origin, and Im [$H^{(n)}$ (u, v)] is anti-symmetrical with respect to the origin. If this result is used, the computing amount and memory consumption can be reduced as follows for the filter $H^{(n)}$ (u, v) when n is fixed to a certain value, for example.

Now it is assumed that the array indexes in the u direction and v direction are p (p=0, 1, . . . , $N_x$–1) and q (q=0, 1, . . . , $N_y$–1) respectively, and $H^{(n)}$ [p, q] is a complex number array having $N_x \times N_y$ number of elements. In the relationship between u and p, it is assumed that u=p when $0 \le p < N_x/2+1$), and u=p–$N_x$ when $N_x/2+1 \le p \le N_x$–1). In the same manner, in the relationship between v and q, it is assumed that v=q when $0 \le q < N_y/2+1$ and v=q–$N_y$ when $N_y/2+1 \le q \le N_y$–1. In this case, the following expression is established based on Expression (13).

$$H^{(n)}[p, q] = \tag{14}$$
$$\overline{H^{(n)}[N_x - p, N_y - q]}\left(0 \le p \le N_x - 1, \frac{N_y}{2} + 1 \le q \le N_y - 1\right)$$

Figure 11:
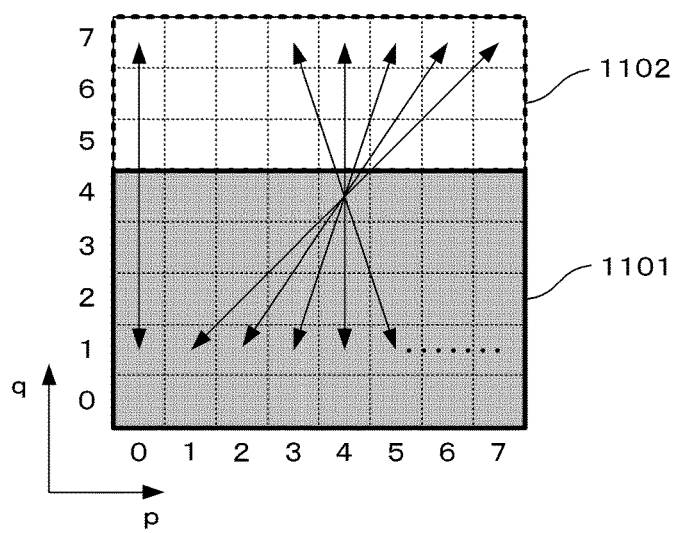
FIG. 11 is a schematic diagram depicting a memory region used by a filter H of Embodiment 2.

As a result, the computing amount and memory consumption required for calculating $H^{(n)}$ [p, q] can be reduced to about ½. More accurately, the computing amount and memory consumption can be reduced to ½+1/$N_y$. FIG. 11 shows this example. FIG. 11 is a schematic diagram of a memory region of the filter $H^{(n)}$ [p, q] when $N_x=N_y=8$. Region 1101 enclosed by the solid line is a region that is actually secured in memory, and region 1102 enclosed by the broken line is a region of which capacity can be reduced by utilizing the above mentioned symmetry. In this example, the computing amount and memory consumption can be reduced to ½+⅛=⅝ since $N_y=8$.

Hence compared with the case when no constraint is imposed, the total memory consumption of the filter H is reduced from $N_x \times N_y \times 4 \times 2 \times N$ to $N_x \times (Ny/2+1) \times 4 \times 2 \times N$ (filter H is assumed to be a single-precision real array), becoming about ½. Similarly, the computing amount is reduced about ½. In this embodiment, the reduction is performed for the q direction, but the same reduction can be performed for the p direction without a problem, and the effect obtained in this case is exactly the same. In the case of using a GPU, however, reduction in the q direction may be preferable due to the characteristics of hardware.

Figure 12:
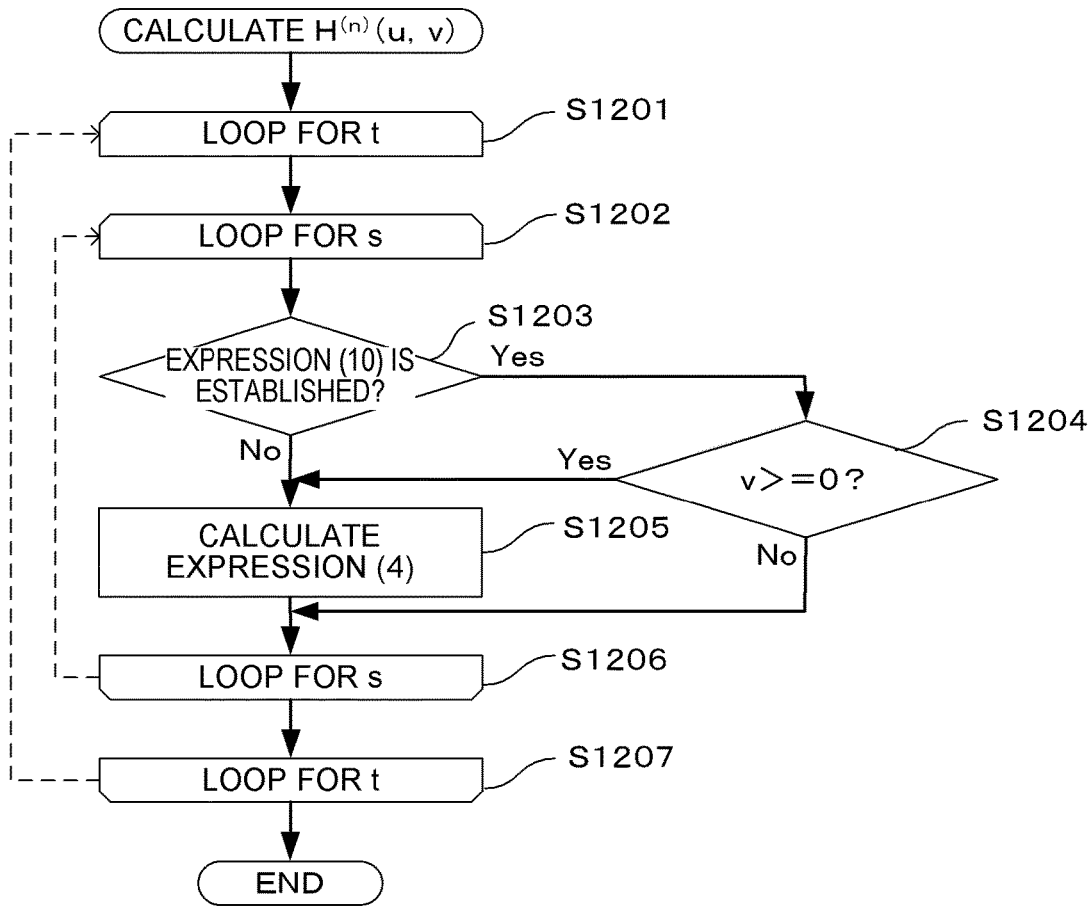
FIG. 12 is a flow chart depicting a flow of a filter H calculating processing of Embodiment 2.

FIG. 12 shows the flow of the filter computing amount reduction processing according to this embodiment. In this embodiment, step S804 in FIG. 8 is replaced with the processing operations in steps S1201 to S1207. Only the processing operations within the double loop on t and s (S1201 to S1207, S1202 to S1206) will be described herein below.

First the filter calculation unit 405 determines whether Expression (10) is established for the three-dimensional blur function h (x, y, z) (condition determination step S1203). If the determination result of step S1203 is YES, the filter calculation unit 405 determines whether the value of v is 0 or more (condition determination step S1204). If the determination result of step S1203 is NO, or if the determination result of step S1204 is YES, the filter calculation unit 405 calculates Expression (4), and stores the result in the storage unit 302 (step S1205), and ends processing within the double loop. If the determination result of step S1204 is NO, the computing amount can be reduced based on Expression (14), hence the processing within the double loop ends.

The description on FIG. 12 is now completed.

(Filter H Reference Processing when Convolutional Sum is Calculated)

Figure 13:
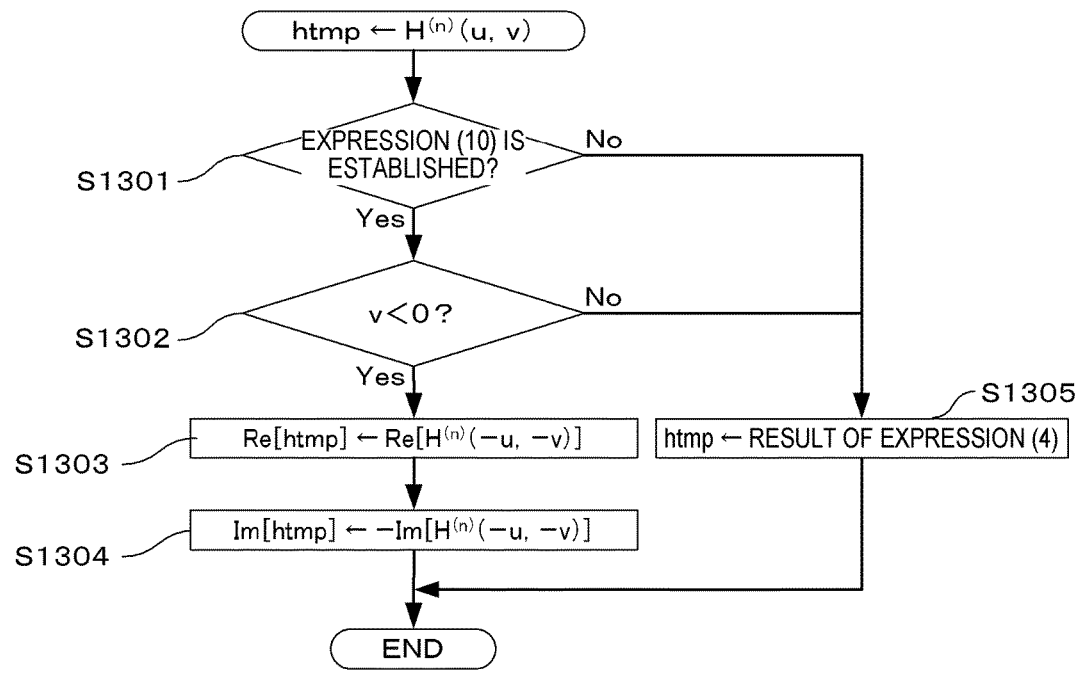
FIG. 13 is a flow chart depicting a flow of a filter H value acquiring processing of Embodiment 2.

FIG. 13 shows the detailed calculation procedure in step S906 when the above mentioned computing amount reducing processing is applied.

First the convolution unit 406 determines whether Expression (10) is established for the three-dimensional blur function h (x, y, z) (condition determination step S1301). If the result of step S1301 is YES, the convolution unit 406 determines whether the value of v is negative (conditional determination step S1302).

If the determination result of step S1302 is YES, the convolution unit 406 determines a complex conjugate of $H^{(n)}$ (–u, –v) which is already stored in the storage unit 302, and substitutes the result for htmp. In other words, the rear part of $H^{(n)}$ (–u, –v) is substituted for the real part of htmp (step S1303), and the imaginary part of $H^{(n)}$ (–u, –v), of which sign is inverted, is substituted for the imaginary part of htmp (step S1304). Then the processing in FIG. 13 is completed.

If the result of step S1301 or of step S1302 is NO, the convolution unit 406 acquires the result, which has already been calculated based on Expression (4), from the storage unit 302, substitutes this result for htmp (step S1305), and completes the processing in FIG. 13.

The description on FIG. 13 is now completed.

As described above, according to this embodiment, the constraint represented by Expression (10) is imposed on the three-dimensional blur function h (x, y, z), whereby the computing amount and memory consumption can be reduced to about ½ in the calculation of the filter $H^{(n)}$ (u, v). By this reduction effect, a desired reconstructed image can be easily generated, even if a computer with lower processing performance is used. The method described in this embodiment can be used seamlessly with the method described in Embodiment 1. In this case, the computing amount and memory consumption can be reduced further.

<Embodiment 3>

Embodiment 3 of the present invention will be described with reference to the drawings.

The configuration of the image generating system, the hardware configuration and the functional blocks of the image generating apparatus, and the algorithm of the depth control processing are the same as those of Embodiment 2. However the configuration of the image input apparatus, the constraint imposed on the three-dimensional blur function, and the specification conditions of the blur effect applied to the reconstructed image are different.

(Internal Configuration of Image Input Apparatus)

Figure 14:
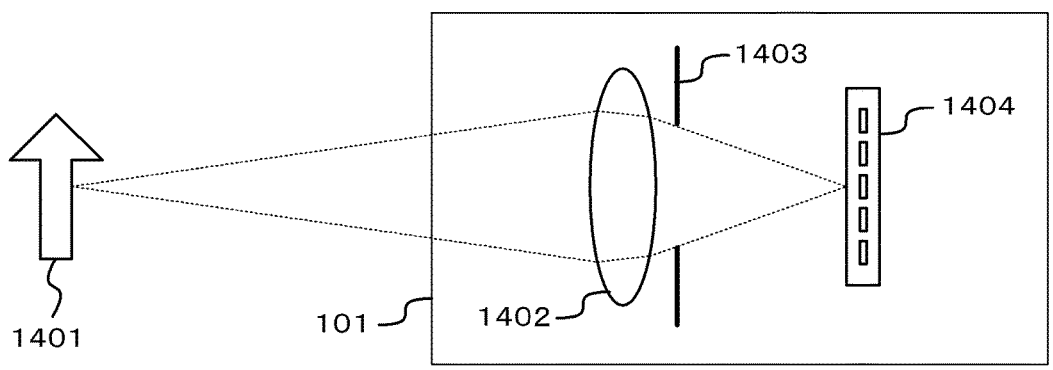
FIG. 14 is a diagram depicting an internal configuration of an image input apparatus of Embodiment 3.

FIG. 14 shows an internal configuration of an image input apparatus 101 according to this embodiment. 1401 denotes an object and is located outside the image input apparatus 101. The light emitted from the object 1401 passes through a lens 1402 and a diaphragm 1403, and forms an image on an imaging unit 1404. The image of the object formed on the imaging unit 1404 is photoelectrically converted and A/D converted by the imaging unit 1404, and is then sent to the image generating apparatus 102 as electric signals. In this embodiment, it is assumed that the development processing, that includes noise removal, color conversion processing and sharpening processing after execution of A/D conversion, is internally performed in the image generating apparatus 102. However it is also possible to perform the development processing by a dedicated image processing unit (not illustrated) connected to the imaging unit 1404, and then transmit the data to the image generating apparatus 102, and this mode is also within the scope of the present invention.

The description on FIG. 14 is now completed.

(Computing Amount Reduction by Introducing Constraint)

In this embodiment, in addition to the constraint described in Embodiment 2, a constraint is imposed on k (s, t) which determines the shape of the three-dimensional blur function and l(s, t) which determines a new blur shape reflected on the reconstructed image.

The constraint imposed on k (s, t) will be described first.

Figure 15:
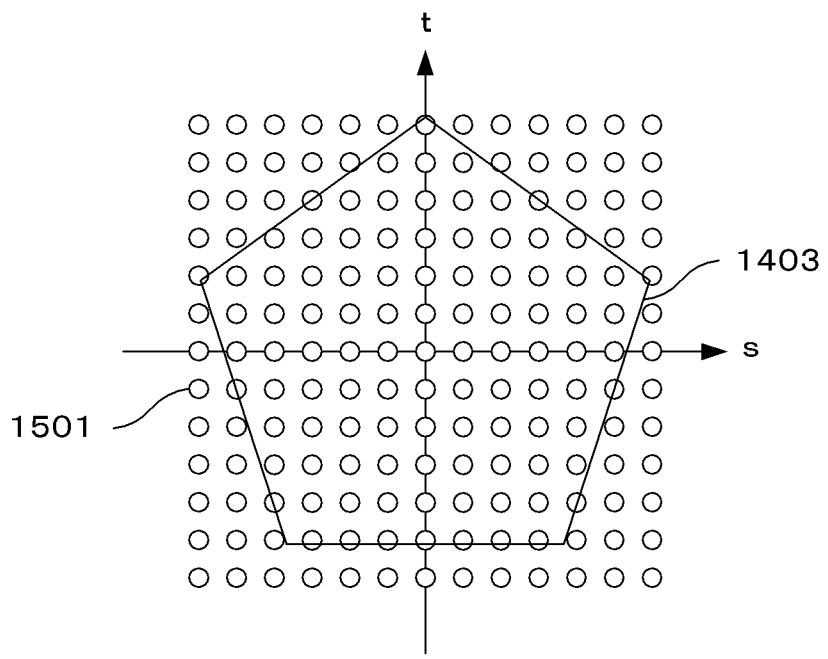
FIG. 15 is a schematic diagram depicting a blur shape that is symmetrical with respect to the t axis of Embodiment 3.

In this embodiment, a constraint, that k (s, t) is symmetrical with respect to at least any one axis which passes through the origin, is set. For example, the constraint of this embodiment is a case when the shape of the diaphragm 1403 is a pentagon and symmetrical with respect to the t axis, as shown in FIG. 15. In the case of a standard digital camera, the shape of the diaphragm is determined by a number of diaphragm blades, hence if the number of diaphragm blades is 5, then the shape of the diaphragm is a pentagon.

To implement this constraint in k (s, t), the arrangement of discrete points 1501 in the (s, t) space must be symmetrical with respect to at least the t axis, and the values defined for the discrete points 1501 must also be symmetrical with respect to the t axis, and be values that appropriately represent the shape of the diaphragm 1403. A possible method for representing the shape by values is setting the values inside the diaphragm 1403 to constants and all values outside the diaphragm 1403 to zero, for example. If these values are multiplied by a two-dimensional Gaussian function centering around the origin, the representation becomes even closer to the actual shape. It is preferable to perform normalization in advance, such as making the sum of k (s, t) values in all of (s, t) to be 1.

In this case, if the arrangement of the discrete points 1501 is symmetrical with respect to the t axis, for example, the following expression is established for the filter C (derivation process is omitted).

$$C_{s,t}(u,v) = C_{-s,t}(-u,v) \quad (15)$$

Figure 16:
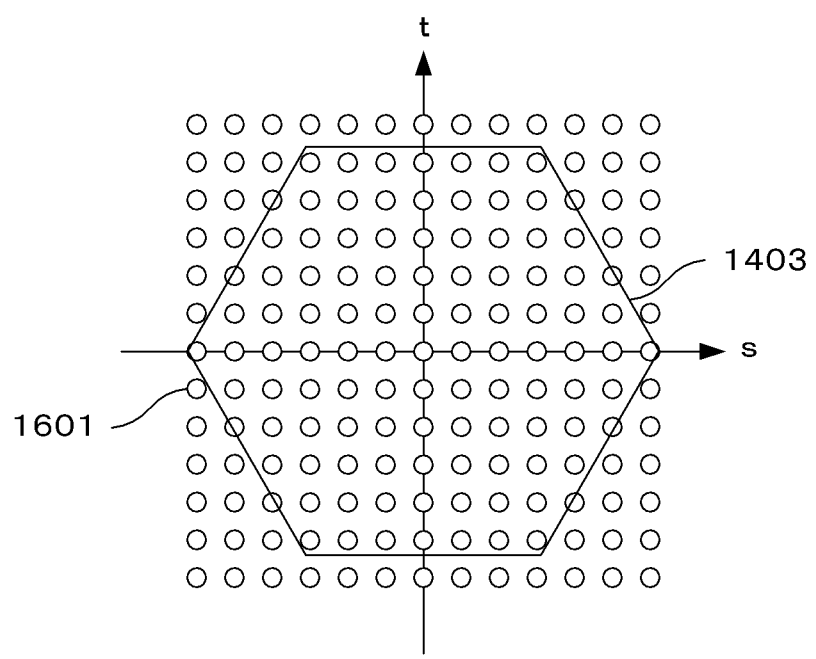
FIG. 16 is a schematic diagram depicting a blur shape that is symmetrical with respect to the s and t axes of Embodiment 3.

A case when k (s, t) is symmetrical with respect to two arbitrary axes that pass through the origin and intersect orthogonally is also included in the constraint according to this embodiment. For example, the constraint of this embodiment is a case when the shape of the diaphragm 1403 is a hexagon, and is symmetrical with respect to the s and t axes, as shown in FIG. 16. In the case of a standard digital camera and the like, the shape of the diaphragm becomes a hexagon if a number of diaphragm blades is 6. In this case, if the arrangement of the discrete points 1501 is symmetrical with respect to the s and t axes, for example, the following expression is established for the filter C (derivation process is omitted).

$$C_{s,t}(u,v) = C_{-s,t}(-u,v) = C_{s,-t}(u,-v) = C_{-s,-t}(-u,-v) = C_{-s,-t}(u,v) \quad (16)$$

The constraint imposed on l (s, t) will be described next.

In this embodiment, a constraint, that l (s, t) is symmetrical with respect to one of the symmetrical axes of k (s, t), is set. A concrete shape of l (s, t) can be arbitrary if the l (s, t) is symmetrical with respect to one axis. The shape may be a pentagon, as shown in FIG. 15, or may be a triangle, heptagon or another shape. In the case of (s, t), where k (s, t) is virtually zero, it is preferable to set the value of l (s, t) to zero as well.

For example, in the case when both k (s, t) and l (s, t) are symmetrical with respect to the t axis, Expression (4) is calculated by the following expression.

$$H^{(n)}(-u, v) = \sum_{s,t} l(s, t) \exp\left(-2\pi i\left(\frac{s(-u)}{N_x} + \frac{tv}{N_y}\right)(n - n_f)\right) \quad (17)$$

$$C_{s,t}(-u, v)^{-1}$$

$$= \sum_{s,t} l(s, t) \exp\left(-2\pi i\left(\frac{(-s)u}{N_x} + \frac{tv}{N_y}\right)(n - n_f)\right)$$

$$C_{-s,t}(u, v)^{-1}$$

$$= \sum_{s,t} l(-s, t) \exp\left(-2\pi i\left(\frac{(-s)u}{N_x} + \frac{tv}{N_y}\right)(n - n_f)\right)$$

$$C_{-s,t}(u, v)^{-1}$$

$$= H^{(n)}(u, v)$$

Thereby it is known that the filter $H^{(n)}$ (u, v) is symmetrical with respect to the v axis. For the transformation from the second expression to the third expression on the right side of Expression (17), the symmetry of l (s, t) with respect to the t axis, was used, and for the transformation from the third expression to the fourth expression on the right side, the symmetry of discrete points with respect to the t axis in the (s, t) space was used.

Further, if the result of this Expression (17) and Expression (13) are used, the following expression is derived.

$$H^{(n)}(u,v) = \overline{H^{(n)}(u,-v)} \quad (18)$$

Thereby it is known that the real part of $H^{(n)}$ (u, v) is symmetrical with respect to the u axis, and the imaginary part thereof is anti-symmetrical with respect to the u axis. As a result, it is sufficient if only the regions of u≥0 and v≥0 are stored in the memory for the filter H. If the remaining regions are required, the filter value that has already been held can be directly used or used with inverting the sign. Thereby the computing amount and memory consumption can be reduced to about ¼.

Figure 17:
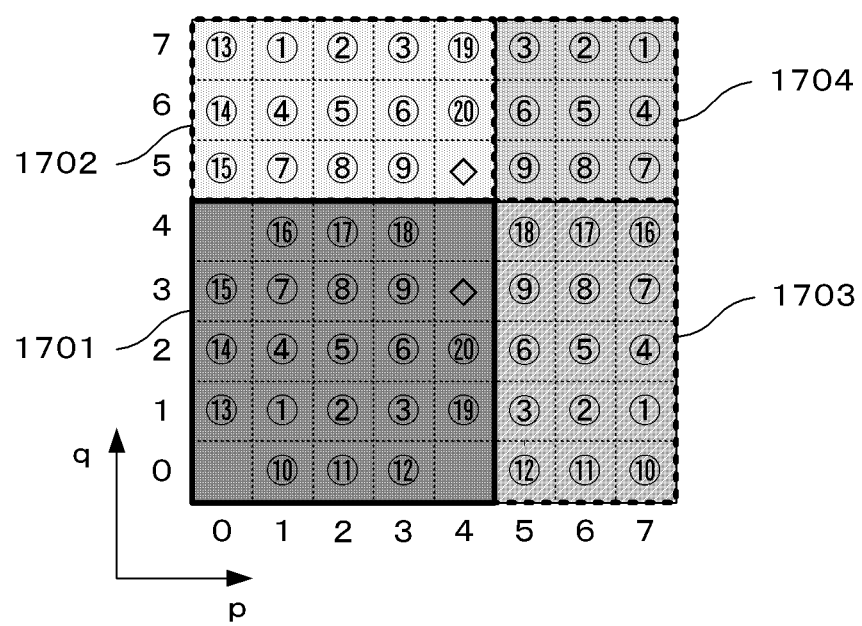
FIG. 17 is a schematic diagram depicting a memory region used by a filter H of Embodiment 3.

FIG. 17 is a schematic diagram of a memory region used by the filter $H^{(n)}$ [p, q] when $N_x = N_y = 8$ (p and q are defined in the same away as Embodiment 2). The region 1701 enclosed by the solid line is a region that is actually secured in memory, and the regions 1702 to 1704 enclosed by the broken line are regions of which capacity can be reduced by utilizing the above mentioned symmetry. To be more specific, the region 1702 is a complex conjugate of the region 1701, the region 1703 has a same value as the region 1701, and the region 1704 is a complex conjugate of the region 1703. The numbers and symbols of each region in FIG. 17 indicate that the memories having a same number or a same symbol are in the above mentioned correspondence relationship. In the example in FIG. 17, the computing amount and memory consumption can be reduced to (5×5)/(8×8)=25/64≅40%. As the values of $N_x$ and $N_y$ increase, the computing amount and the memory consumption are reduced, but is ¼ at the maximum.

In this embodiment, a case when both k (s, t) and l (s, t) are symmetrical with respect to the t axis was described, but a similar reduction effect can also be obtained even if both k (s, t) and l (s, t) are symmetrical with respect to the s axis, for example. In this case however, $H^{(n)}$ (u, v) is symmetrical with respect to the u axis, and the real part of $H^{(n)}$ (u, v)) is symmetrical with respect to the v axis, and the imaginary part thereof is anti-symmetrical with respect to the v axis. If k (s, t) is symmetrical with respect to both the s and t axes, a similar reduction effect can be expected for l (s, t) only if l (s, t) is symmetrical with respect to either the s axis or t axis. The symmetrical axes need not match with the s axis or t axis, and can be an arbitrary axis passing through the origin. The minimum requirement is that the symmetrical axis of k (s, t) and the symmetrical axis of l (s, t) match. However, even in such a case, it is preferable, in a practical sense, that the symmetrical axis of k (s, t) and l (s, t) are appropriately turned so as to match with the s axis or t axis, since processing becomes easier. In the case when k (s, t) has rotational symmetry with respect to the origin (s, t)=(0, 0), a number of possible symmetrical axes of k (s, t) is infinite. Therefore in this case, the effect described in this embodiment can be obtained regardless the type of symmetrical axis, only if l (s, t) is symmetrical with respect to one arbitrary axis.

Figure 18:
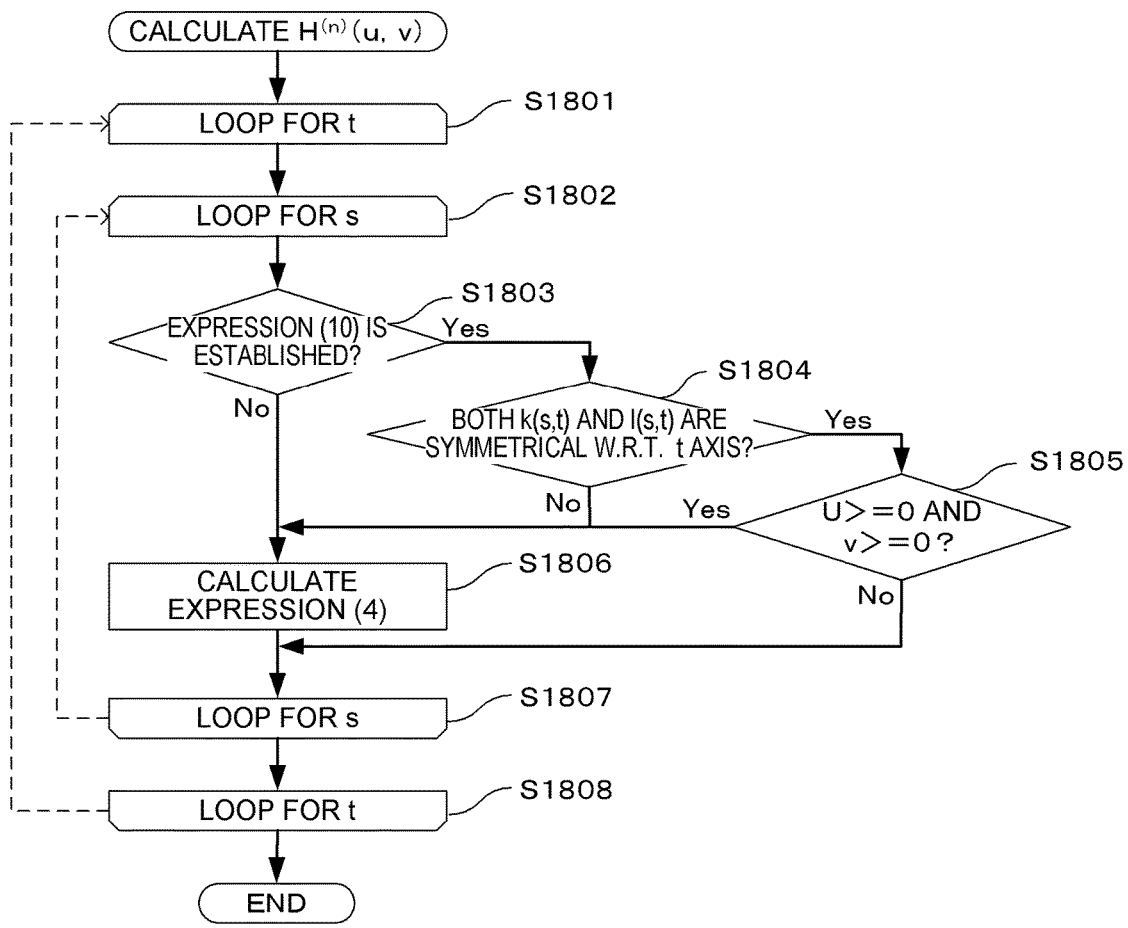
FIG. 18 is a flow chart depicting a flow of a filter H calculating processing of Embodiment 3.

FIG. 18 shows the flow of the filter computing amount reduction processing according to this embodiment. In this embodiment, step S804 in FIG. 8 is replaced with the processing operations in step S1801 to S1808. Only the processing operations within the double loop on t and s (S1801 to S1808, S1802 to S1807) will be described herein below.

First the filter calculation unit 405 determines whether Expression (10) is established for the three-dimensional blur function h (x, y, z) (condition determination step S1803). If the determination result of step S1803 is YES, the filter calculation unit 405 determines whether k (s, t) and l (s, t) are both symmetrical with respect to the t axis (condition determination step S1804). If the determination result of step S1804 is YES, the filter calculation unit 405 determines whether the values of u and v are both 0 or more (condition determination S1805). If the determination result of step S1805 is NO, the computing amount can be reduced based on Expression (17) and Expression (18), hence the processing operations within the double loop end here. If the determination result of step S1803 or S1804 is NO, or if the determination result of step S1805 is YES, the filter calculation unit 405 executes the calculation of Expression (4), stores the result in the storage unit 302 (step S1806), and ends the processing operations within the double loop.

The description on FIG. 18 is now completed.

(Filter H Reference Processing when Convolutional Sum is Calculated)

Figure 19:
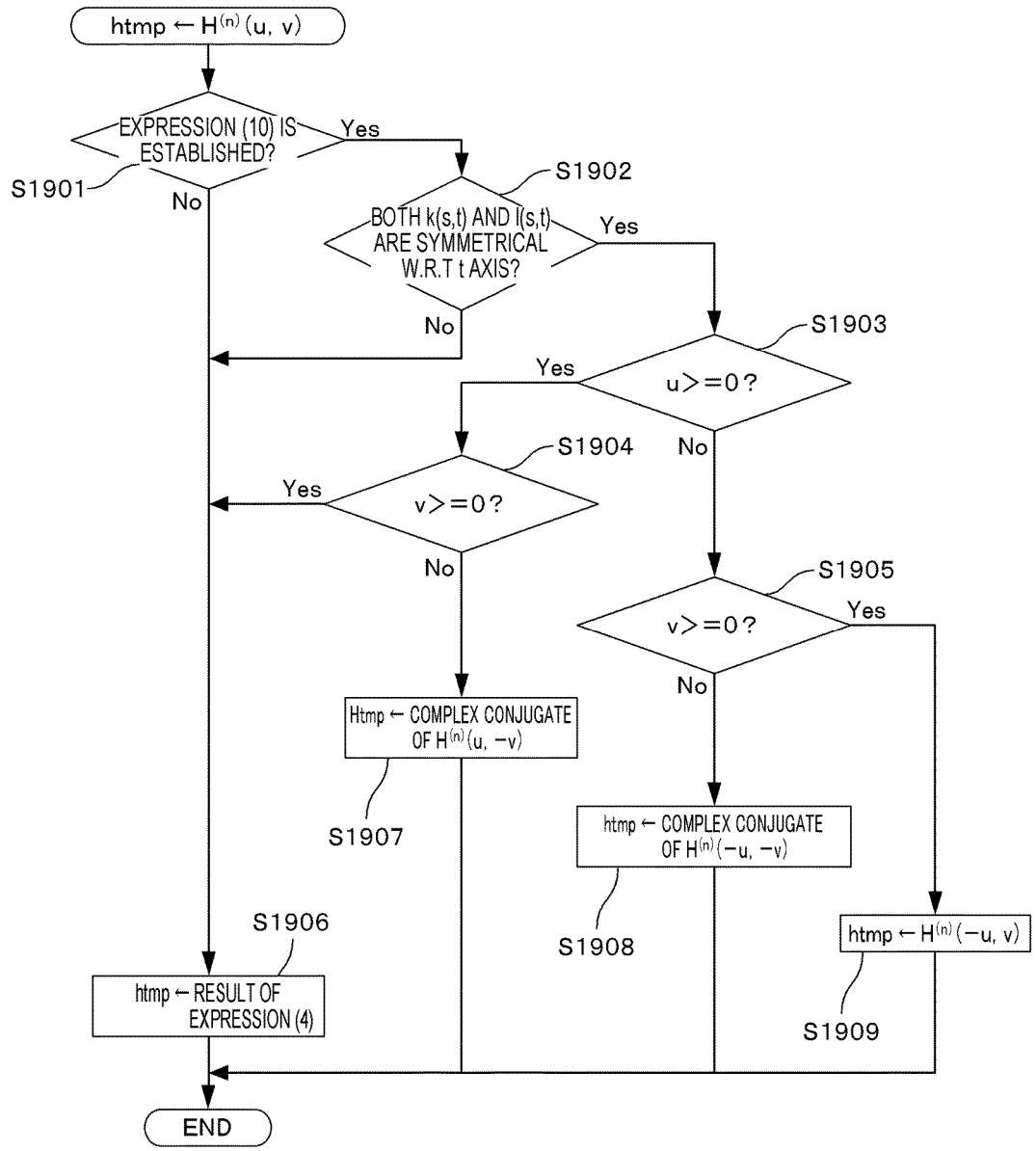
FIG. 19 is a flow chart depicting a flow of a filter H value acquiring processing of Embodiment 3.

FIG. 19 shows the detailed calculation procedure in step S906 when the above mentioned computing amount reduction processing is applied.

First the convolution unit 406 determines whether Expression (10) is established for the three-dimensional blur function h (x, y, z) (condition determination step S1901). If the result of step S1901 is YES, the convolution unit 406 determines whether k (s, t) and l (s, t) are both symmetrical with respect to the t axis (condition determination step S1902). If the determination result of step S1902 is YES, the convolution unit 406 determines the ranges of the values of u and v (condition determination steps S1903 to S1905).

If the determination result of step S1901 or S1902 is NO, or if the determination results of step S1903 and step S1904 are both YES, processing advances to step S1906. Here the convolution unit 406 acquires the result of the calculation based on Expression (4) from the storage unit 302, substitutes the result for htmp (step S1906), and ends the processing in FIG. 19.

If the determination result of step S1903 is YES and the determination result of step S1904 is NO, then processing advances to step S1907. Here the convolution unit 406 determines a complex conjugate of $H^{(n)}$ (u, −v) which has already been stored in the storage unit 302, substitutes the result for htmp (step S1907), and ends the processing in FIG. 19.

If the determination results of step S1903 and step S1905 are both NO, the convolution unit 406 determines the complex conjugate of $H^{(n)}$ (−u, −v) which has already been stored in the storage unit 302, substitutes the result for htmp (step S1908), and ends the processing in FIG. 19.

If the determination result of step S1903 is NO and the determination result of step S1905 is YES, the convolution unit 406 substitutes the value of $H^{(n)}$ (−u, v) which has already been stored in the storage unit 302 for htmp (step S1909), and ends the processing in FIG. 19.

The description on FIG. 19 is now completed.

As described above, according to this embodiment, the constraint that the symmetrical axis of k (s, t) and symmetrical axis of l (s, t) match is imposed, in addition to the constraint described in Embodiment 2, whereby the computing amount and memory consumption of the filter H can be reduced to about ¼ at the maximum. When the value of the filter H is used, however, an appropriate sign inversion operation must be performed for the value of the filter H. Whether this sign inversion operation is required or not depends on the value of (u, v) and on the type of the symmetrical axis. The method described in this embodiment can be used seamlessly with the method described in Embodiment 1. In this case, the reduction effect by this embodiment can be obtained in addition to the reduction effect described in Embodiment 1.

<Embodiment 4>

Embodiment 4 of the present invention will be described with reference to the drawings.

The configuration of the image generating system, the configuration of the image input apparatus, the hardware configuration and functional blocks of the image generating apparatus, and the algorithm of the depth control processing are the same as those of Embodiment 3. However, the constraint imposed on the three-dimensional blur function and the specification conditions of a new blur shape, that is applied to the reconstructed image, are different.

In this embodiment, in addition to the constraints described in Embodiment 2, a constraint is imposed on k (s, t) which determines the shape of the three-dimensional blur function, and on l (s, t) which determines the new blur shape reflected on the reconstructed image.

Figure 20:
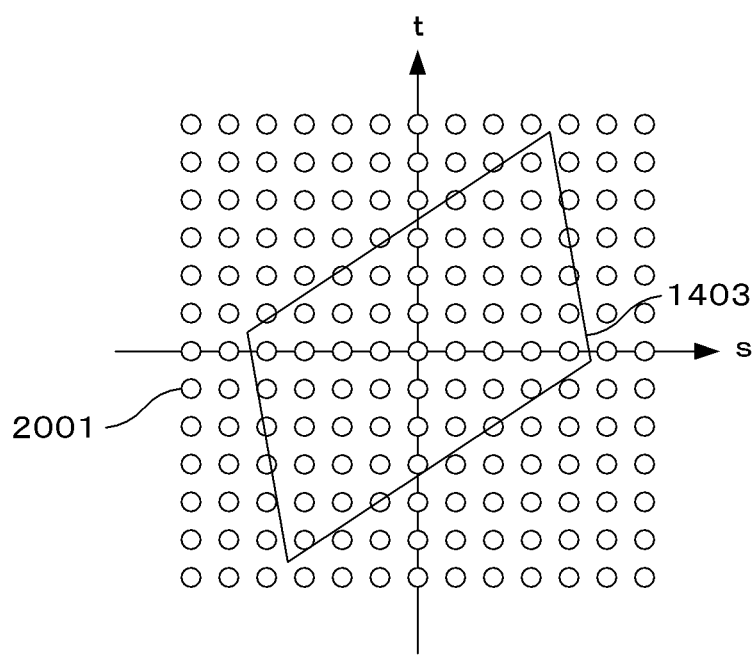
FIG. 20 is a schematic diagram depicting a blur shape that is symmetrical with respect to an origin of an (s, t) space of Embodiment 4.

First, the constraint imposed on k (s, t) will be described. In this embodiment, a constraint, that k (s, t) is point-symmetrical with respect to the origin (s, t)=(0, 0), is set. For example, the constraint of this embodiment is a case when the diaphragm 1403 has a shape of parallelogram, as shown in FIG. 20. In this case, the following expression is established for the filter C (derivation process is omitted).

$$C_{s,t}(u,v)=C_{-s,-t} \tag{19}$$

The constraint imposed on l (s, t) will be described next. In this embodiment, a constraint, that l (s, t) is point-symmetrical with respect to the origin, is set, just like k (s, t). A concrete shape of l (s, t) can be any shape as long as the symmetry with respect to the origin is satisfied. In the case of (s, t) in which k (s, t) is virtually zero, however, it is preferable to set the value of l (s, t) to zero as well. This is described in Embodiment 3.

As mentioned above, in the case when both k (s, t) and l (s, t) are symmetrical with respect to the origin, if the following expression is established, $$H_{s,t}^{(n)}(u, v) = \exp\left(-2\pi i\left(\frac{su}{N_x} + \frac{tv}{N_y}\right)(n - n_f)\right)C_{s,t}(u, v)^{-1} \quad (20)$$

then Expression (4) can be transformed as the following expression.

$$H^{(n)}(u, v) = \sum_{s>0, t\geq 0} l(s, t)H_{s,t}^{(n)}(u, v) + \sum_{s\leq 0, t>0} l(s, t)H_{s,t}^{(n)}(u, v) + \quad (21)$$
$$\sum_{s<0, t\leq 0} l(s, t)H_{s,t}^{(n)}(u, v) + \sum_{s\geq 0, t<0} l(s, t)H_{s,t}^{(n)}(u, v) +$$
$$l(0, 0)H_{0,0}^{(n)}(u, v)$$
$$= \sum_{s>0, t\geq 0}(l(s, t)H_{s,t}^{(n)}(u, v) + l(-s, -t)H_{-s,-t}^{(n)}(u, v)) +$$
$$\sum_{s\leq 0, t>0}(l(s, t)H_{s,t}^{(n)}(u, v) + l(-s, -t)H_{-s,-t}^{(n)}(u, v)) +$$
$$(0, 0)C_{0,0}(u, v)^{-1}$$
$$= \sum_{s>0, t\geq 0} l(s, t)\left(H_{s,t}^{(n)}(u, v) + \overline{H_{s,t}^{(n)}(u, v)}\right) +$$
$$\sum_{s\leq 0, t>0} l(s, t)\left(H_{s,t}^{(n)}(u, v) + \overline{H_{s,t}^{(n)}(u, v)}\right) + l(0, 0)C_{0,0}(u, v)^{-1}$$

For the transformation from the second expression to the third expression on the right side, Expression (19) and the symmetry of l (s, t) with respect to the origin are used.

The real part of Expression (21) is given by the following expression.

$$\text{Re}[H^{(n)}(u, v)] = \sum_{s>0, t\geq 0} l(s, t)\text{Re}\left[H_{s,t}^{(n)}(u, v) + \overline{H_{s,t}^{(n)}(u, v)}\right] + \quad (22)$$
$$\sum_{s\leq 0, t>0} l(s, t)\text{Re}\left[H_{s,t}^{(n)}(u, v) + \overline{H_{s,t}^{(n)}(u, v)}\right] +$$
$$l(0, 0)C_{0,0}(u, v)^{-1}$$
$$= 2\sum_{s>0, t\geq 0} l(s, t)\text{Re}[H_{s,t}^{(n)}(u, v)] +$$
$$2\sum_{s\leq 0, t>0} l(s, t)\text{Re}[H_{s,t}^{(n)}(u, v)] + l(0, 0)C_{0,0}(u, v)^{-1}$$

Thereby it is known that a number of loops of the sum in the t direction become ½, hence the computing amount can also be reduced to about ½. For the memory consumption, however, no particular reduction effect is obtained.

The imaginary part of Expression (21) is given by the following expression.

$$\text{Im}[H^{(n)}(u, v)] = \sum_{s>0, t\geq 0} l(s, t)\text{Im}\left[H_{s,t}^{(n)}(u, v) + \overline{H_{s,t}^{(n)}(u, v)}\right] + \quad (23)$$
$$\sum_{s\leq 0, t>0} l(s, t)\text{Im}\left[H_{s,t}^{(n)}(u, v) + \overline{H_{s,t}^{(n)}(u, v)}\right]$$
$$= 0$$

Thereby it is known that the imaginary part of Expression (21) is cancelled, with a zero result. In other words, in this case, it is unnecessary to secure memory for the imaginary part.

Figure 21:
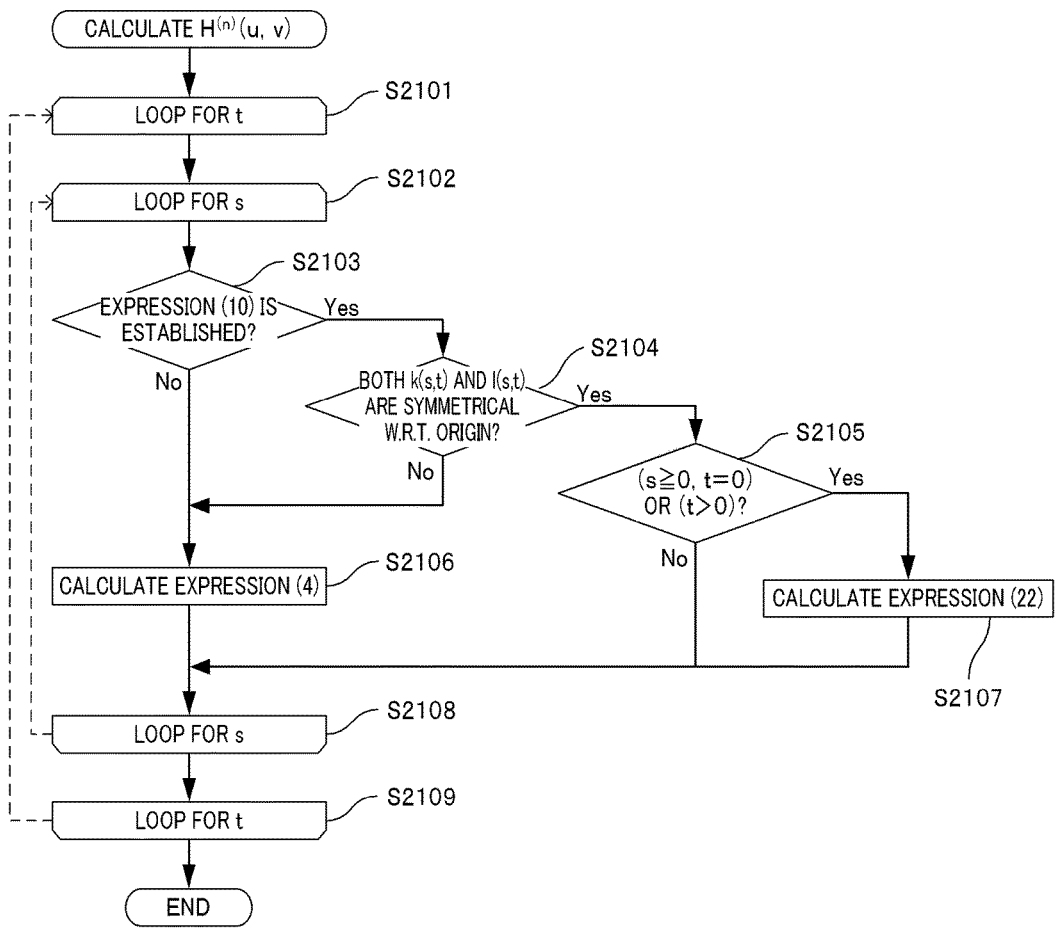
FIG. 21 is a flow chart depicting a flow of a filter H calculating processing of Embodiment 4.

FIG. 21 shows the flow of the filter computing amount reduction processing according to this embodiment. In this embodiment, step S804 in FIG. 8 is replaced with the processing operations in steps S2101 to S2109. Only the processing operations within the double loop on t and s (S2101 to S2109, S2102 to S2108) will be described herein below.

First, the filter calculation unit 405 determines whether Expression (10) is established for the three-dimensional blur function h (x, y, z) (condition determination step S2103). If the determination result of step S2103 is YES, the filter calculation unit 405 determines whether k (s, t) and l (s, t) are both symmetrical with respect to the origin (condition determination step S2104). If the determination result of step S2103 or S2104 is NO, the filter calculation unit 405 executes the calculation of Expression (4), stores the result in the storage unit 302 (step S2106), and ends the processing operations within the double loop.

If the determination result of step S2104 is YES, the filter calculation unit 405 determines whether s is 0 or more and t is 0, or whether t is positive (condition determination step S2105). If the determination result of step S2105 is YES, the filter calculation unit 405 executes the calculation of Expression (22), stores the result in the storage unit 302 (step S2107), and ends the processing operations within the double loop. If the determination result of step S2105 is NO, the computing amount can be reduced based on Expression (22) and Expression (23), hence the processing operations within the double loop end here.

The description of FIG. 21 is now completed.

(Filter H Reference Processing when Convolutional Sum is Calculated)

Figure 22:
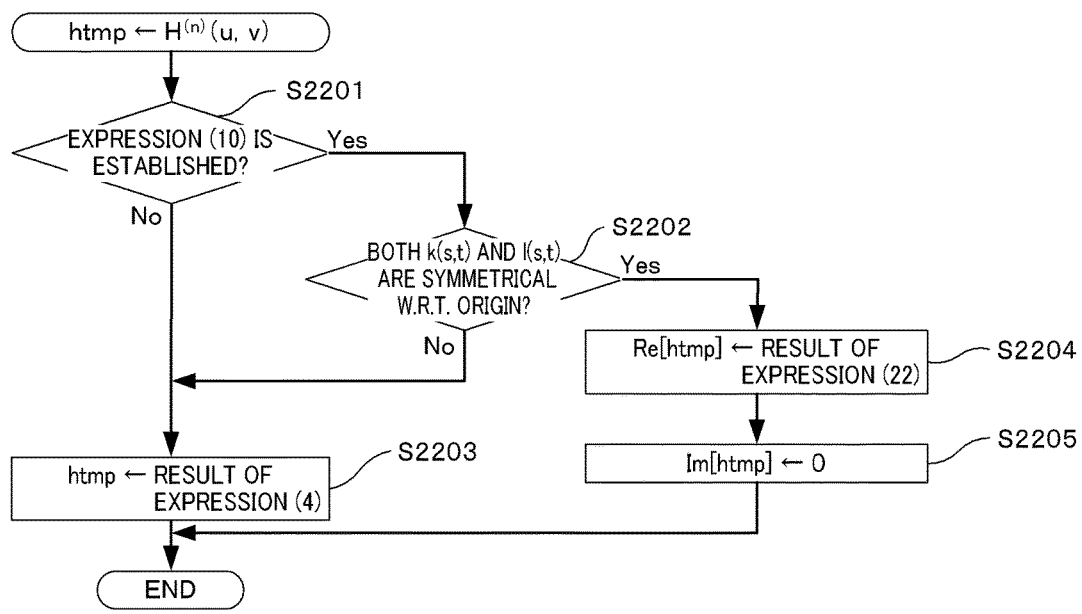
FIG. 22 is a flow chart depicting a flow of a filter H value acquiring processing of Embodiment 4.

FIG. 22 shows the detailed calculation procedure in step S906 when the above mentioned computing amount reduction processing is applied.

First, the convolution unit 406 determines whether Expression (10) is established for the three-dimensional blur function h (x, z, z) (condition determination step S2201). If the result of step S2201 is YES, the convolution unit 406 determines whether k (s, t) and l (s, t) are both symmetrical with respect to the origin (condition determination step S2202). If the determination result of step S2201 or step S2202 is NO, the convolution unit 406 acquires the result, which has already been calculated based on Expression (4), from the storage unit 302, substitutes the result for htmp (step S2203), and ends the processing in FIG. 22. If the determination result of step S2202 is YES, the convolution unit 406 acquires the result, which has already been calculated based on Expression (22), from the storage unit 302, and substitutes the result for the real part of htmp (step S2204). After the step S2204, the convolution unit 406 substitutes zero for the imaginary part of htmp (step S2205), and ends the processing in FIG. 22.

The description on FIG. 22 is now completed.

In this embodiment, a case when k (s, t) is symmetrical with respect to the origin was described, but Expression (19) is established if k (s, t) is symmetrical with respect to two arbitrary axes that intersect orthogonally, or is rotationally symmetrical with respect to the origin (derivation process is omitted). Even in such a case, the effects of reducing the computing amount and memory consumption described in this embodiment can be expected. Therefore even if the relationship of k (s, t) and l (s, t) are reversed, the effect of this embodiment can be expected.

As described above, according to this embodiment, the constraint, that k (s, t) and l (s, t) are symmetrical with respect to the origin, is imposed, in addition to constraint described in Embodiment 2, whereby the computing amount of the filter H can be reduced to about ¼ (about ½ for the real part and zero for the imaginary part). At the same time, memory consumption can also be reduced to about ½ (unchanged for the real part, and zero for the imaginary part) at the maximum. The method described in this embodiment can be used seamlessly with the methods described in Embodiments 1 and 2. In this case, the reduction effect by this embodiment can be obtained in addition to the reduction effect described in Embodiments 1 and 2.

<Embodiment 5>

Embodiment 5 of the present invention will be described with reference to the drawings.

The configuration of the image generating system, the configuration of the image input apparatus, the hardware configuration and the functional blocks of the image generating apparatus, and the algorithm of the depth control processing are the same as those of Embodiment 3. However, the constraint imposed on the three-dimensional blur function and the specification conditions of the blur effect, that is applied to the reconstructed image, are different.

In this embodiment, in addition to the constraint described in Embodiment 2, constraints are imposed on k (s, t) which determines the shape of the three-dimensional blur function and l (s, t) which determines the new blur shape reflected on the reconstructed image. In concrete terms, a constraint, that k (s, t) and l (s, t) are both symmetrical with respect to two arbitrary axes which pass through the origin (s, t)=(0, 0) and intersect orthogonally, and that these two axes match in k (s, t) and l (s, t), is set.

For example, in the case when both k (s, t) and l (s, t) are symmetrical with respect to the s axis and t axis, Expression (4) is calculated as the following expression.

$$H^{(n)}(u, v) = \sum_{s,t} l(s, t)\exp\left(-2\pi i\left(\frac{su}{N_x} + \frac{tv}{N_y}\right)(n - n_f)\right) \quad (24)$$

$$C_{s,t}(u, v)^{-1}$$

$$= \sum_{s,t} l(-s, -t)\exp\left(2\pi i\left(\frac{(-s)u}{N_x} + \frac{(-t)v}{N_y}\right)(n - n_f)\right)$$

$$C_{-s,-t}(u, v)^{-1}$$

$$= \overline{H^{(n)}(u, v)}$$

To transform from the first expression to the second expression on the right side, the relationship in Expression (16) derived from the symmetry of k (s, t) with respect to the s axis and t axis, and the symmetry of l (s, t) with respect to the s axis and t axis, were used. As Expression (24) shows, in this embodiment the imaginary part of the filter $H^{(n)}$ (u, v) is always zero.

It is also known that the following Expressions are established.

$$H^{(n)}(-u, v) = \sum_{s,t} l(s, t)\exp\left(-2\pi i\left(\frac{s(-u)}{N_x} + \frac{tv}{N_y}\right)(n - n_f)\right) \quad (25)$$

$$C_{s,t}(-u, v)^{-1}$$

$$= \sum_{s,t} l(s, t)\exp\left(-2\pi i\left(\frac{(-s)u}{N_x} + \frac{tv}{N_y}\right)(n - n_f)\right)$$

$$C_{-s,t}(u, v)^{-1}$$

$$= \sum_{s,t} l(-s, t)\exp\left(-2\pi i\left(\frac{su}{N_x} + \frac{tv}{N_y}\right)(n - n_f)\right)$$

$$C_{s,t}(u, v)^{-1}$$

$$\sum_{s,t} l(s, t)\exp\left(-2\pi i\left(\frac{su}{N_x} + \frac{tv}{N_y}\right)(n - n_f)\right)$$

$$C_{s,t}(u, v)^{-1}$$

$$= H^{(n)}(u, v)$$

$$H^{(n)}(u, -v) = \sum_{s,t} l(s, t)\exp\left(-2\pi i\left(\frac{su}{N_x} + \frac{t(-v)}{N_y}\right)(n - n_f)\right) \quad (26)$$

$$C_{s,t}(u, -v)^{-1}$$

$$= \sum_{s,t} l(s, t)\exp\left(-2\pi i\left(\frac{su}{N_x} + \frac{(-t)v}{N_y}\right)(n - n_f)\right)$$

$$C_{s,-t}(u, v)^{-1}$$

$$= \sum_{s,t} l(s, -t)\exp\left(-2\pi i\left(\frac{su}{N_x} + \frac{tv}{N_y}\right)(n - n_f)\right)$$

$$C_{s,t}(u, v)^{-1}$$

$$\sum_{s,t} l(s, t)\exp\left(-2\pi i\left(\frac{su}{N_x} + \frac{tv}{N_y}\right)(n - n_f)\right)$$

$$C_{s,t}(u, v)^{-1}$$

$$= H^{(n)}(u, v)$$

$$H^{(n)}(-u, -v) = \sum_{s,t} l(s, t)\exp\left(-2\pi i\left(\frac{s(-u)}{N_x} + \frac{t(-v)}{N_y}\right)(n - n_f)\right) \quad (27)$$

$$C_{s,t}(-u, -v)^{-1}$$

$$= \sum_{s,t} l(s, t)\exp\left(-2\pi i\left(\frac{(-s)u}{N_x} + \frac{(-t)v}{N_y}\right)(n - n_f)\right)$$

$$C_{-s,-t}(u, v)^{-1}$$

$$= \sum_{s,t} l(-s, -t)\exp\left(-2\pi i\left(\frac{su}{N_x} + \frac{tv}{N_y}\right)(n - n_f)\right)$$

$$C_{s,t}(u, v)^{-1}$$

$$\sum_{s,t} l(s, t)\exp\left(-2\pi i\left(\frac{su}{N_x} + \frac{tv}{N_y}\right)(n - n_f)\right)$$

$$C_{s,t}(u, v)^{-1}$$

$$= H^{(n)}(u, v)$$

Hence the following expression is finally established.

$$H^{(n)}(u,v) = H^{(n)}(-u,v) = H^{(n)}(u,-v) = H^{(n)}(-u,-v) \quad (28)$$

Thereby it is known that the filter $H^{(n)}$ (u, v) is symmetrical with respect to the u axis and v axis.

As a result, it is sufficient if only the regions of $u \geq 0$ and $v \geq 0$ are stored in the memory for the real part of the filter H. If the remaining regions are required, the filter values that have already been held can be directly used, whereby the computing amount and memory consumption can be reduce to about ¼. Computing and memory are not required at all for the imaginary part, since it is known that the imaginary part is always zero.

A schematic diagram of a memory region used by the filter H when k (s, t) and l (s, t) are both symmetrical with respect to a same axis, has already been shown in FIG. 17. This schematic diagram can also be used for this embodiment. The correspondence of the numbers and symbols in each region of the memory in FIG. 17 can be used here as well, but in this embodiment, unlike Embodiment 3, all the values of the filter H in the regions 1702 to 1704 can be substituted by referring to the values in region 1701.

Figure 23:
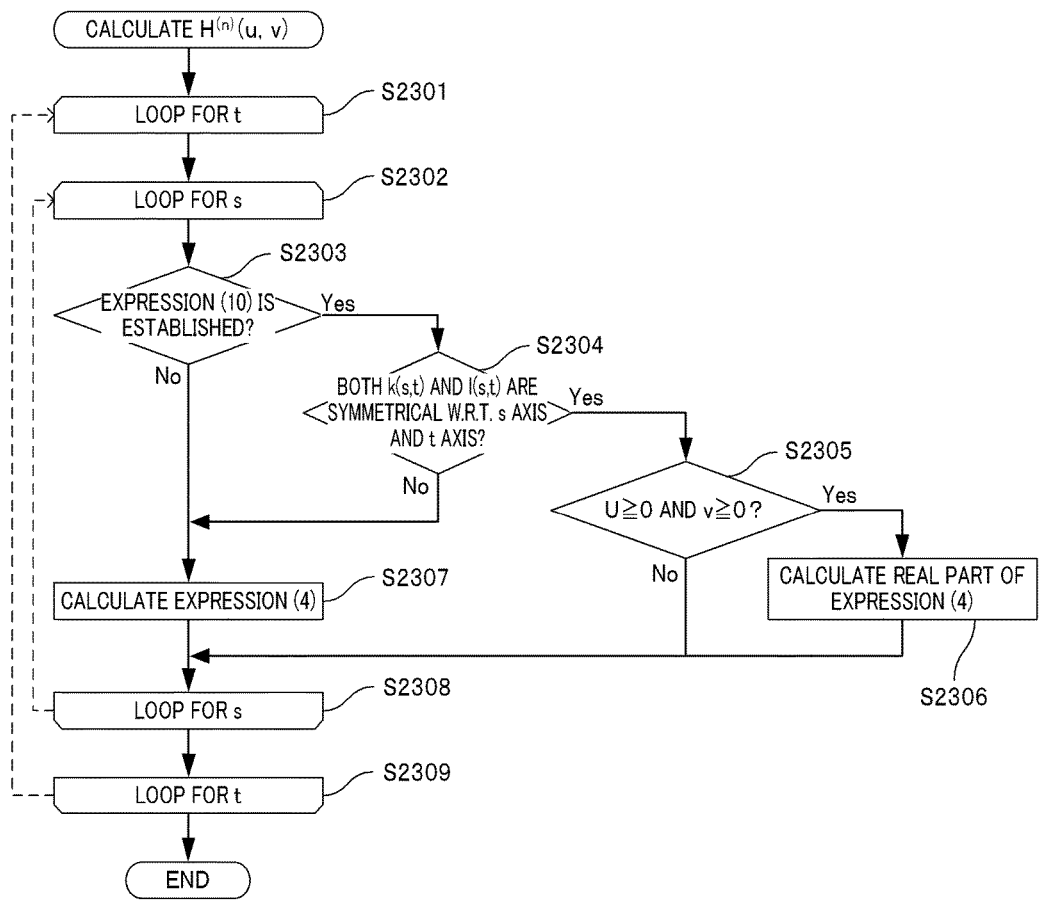
FIG. 23 is a flow chart depicting a flow of a filter H calculating processing of Embodiment 5.

FIG. 23 shows the flow of the filter computing amount reduction processing according to this embodiment. In this embodiment, step S804 in FIG. 8 is replaced with the processing operations in steps S2301 to S2309. Only the processing operations within the double loop on t and s (S2301 to S2309, S2302 to S2308) will be described herein below.

First, the filter calculation unit 405 determines whether Expression (10) is established for the three-dimensional blur function h (x, y, z) (condition determination step S2303). If the determination result of step S2303 is YES, the filter calculation unit 405 determines whether k (s, t) and l (s, t) are both symmetrical with respect to the two axes: s axis and t axis (condition determination step S2304). If the determination result of step S2304 is YES, the filter calculation unit 405 determines whether the values of u and v are both 0 or more (condition determination step S2305).

If the determination result of step S2305 is YES, the filter calculation unit 405 executes the calculation of the real part of Expression (4), and stores the result in the storage unit 302 (step S2306). If the determination result of step S2305 is NO, the computing amount can be reduced based on Expression (24) and Expression (28), hence the processing within the double loop end here.

If the determination result of step S2303 or S2304 is NO, the filter calculation unit 405 executes the calculation of Expression (4), and stores the result in the storage unit 302 (step S2307), and ends the processing operations within the double loop.

The description on FIG. 23 is now completed.

(Filter H Reference Processing when Convolutional Sum is Calculated)

Figure 24:
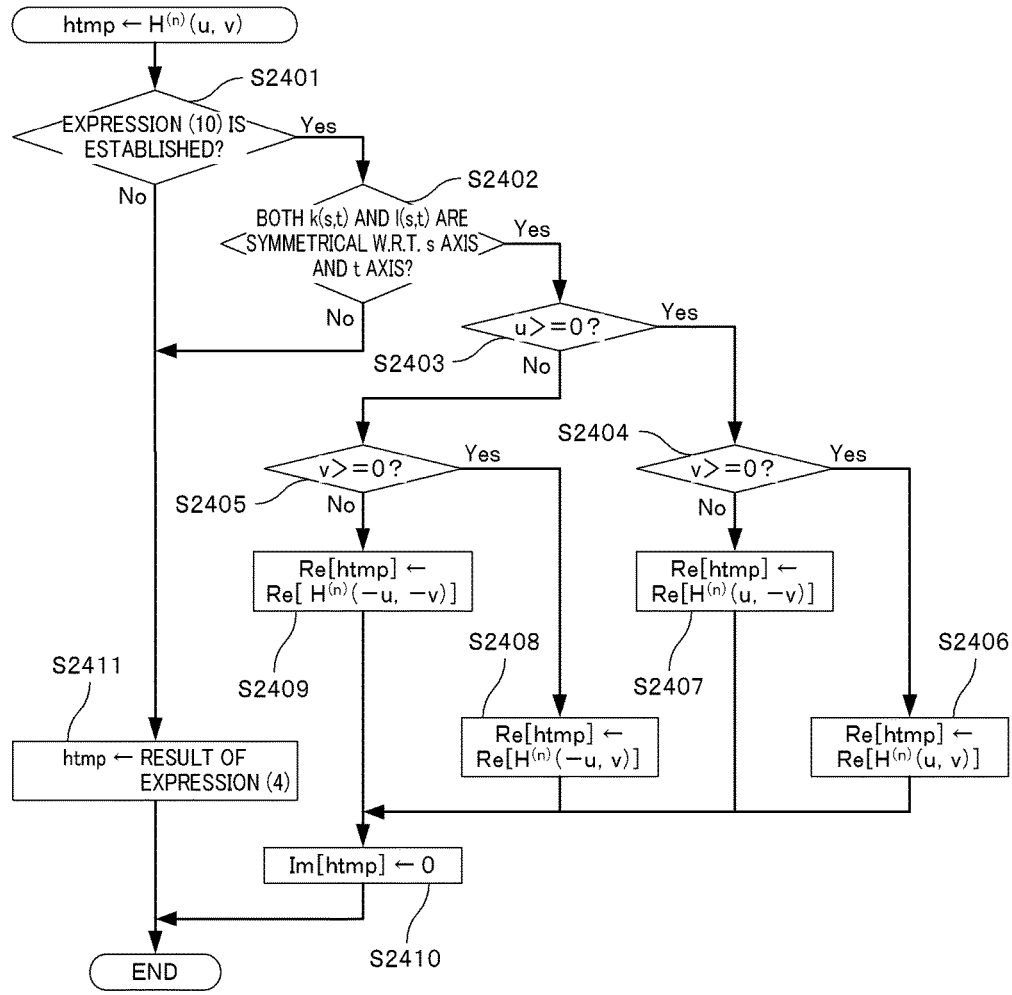
FIG. 24 is a flow chart depicting a flow of a filter H value acquiring processing of Embodiment 5.

FIG. 24 shows the detailed calculation procedure in step S906 when the above mentioned computing amount reduction processing is applied.

First, the convolution unit 406 determines whether Expression (10) is established for the three-dimensional blur function h (x, y, z) (condition determination step S2401). If the result of step S2401 is YES, the convolution unit 406 determines whether k (s, t) and l (s, t) are both symmetrical with respect to the s axis and t axis (condition determination step S2402). If the determination result of step S2402 is YES, the convolution unit 406 determines the ranges of u and v values (condition determination steps S2403 to S2405).

If the determination results of step S2403 and step S2404 are both YES, the convolution unit 406 acquires the real part of $H^{(n)}$ (u, v) which has already been stored in the storage unit 302, and substitutes the result for the real part of htmp (step S2406). If the determination result of step S2403 is YES and the determination result of step S2404 is NO, the convolution unit 406 acquires the real part of $H^{(n)}$ (u, −v) which has already been stored in the storage unit 302, and substitutes the result for the real part of htmp (step S2407). If the determination result of step S2403 is NO and the determination result of step S2405 is YES, the convolution unit 406 acquires the real part of $H^{(n)}$ (−u, v) which is already stored in the storage unit 302, and substitutes the result for the real part of htmp (step S2408). If the determination results of step S2403 and S2405 are both NO, the convolution unit 406 acquires the real part of $H^{(n)}$ (−u, −v) which has already been stored in the storage unit 302, and substitutes the result for the real part of htmp (step S2409). After steps S2406 to S2409, the convolution unit 406 substitutes zero for the imaginary part of htmp (step S2410), and ends the processing in FIG. 24.

If the determination result of step S2401 or S2402 is NO, the convolution unit 406 acquires the result calculated based on Expression (4) from the storage unit 302, substitutes this result for htmp (step S2411), and ends the processing in FIG. 24.

The description on FIG. 24 is now completed.

In this embodiment, a case when both k (s, t) and l (s, t) are symmetrical with respect to the s axis and t axis was described, but these symmetrical axes need not match with the s axis and t axis, and may be two arbitrary axes which pass through the origin and intersect orthogonally. The minimum requirement is that the symmetrical axes of k (s, t) and the symmetric axes of l (s, t) match. However even in such a case, it is preferable in a practical sense, that the symmetrical axes of k (s, t) and l (s, t) are appropriately turned so as to match with the s axis and t axis, since the processing becomes easier. If k (s, t) is rotationally symmetrical with respect to the origin (s, t)=(0, 0), a number of possible symmetrical axes of k (s, t) is infinite, therefore in this case, the effect described in this embodiment can be obtained only if l (s, t) is symmetrical with respect to two arbitrary axes that intersect orthogonally. The effect of this embodiment can be expected without problems, even if the relationship of the constraints of k (s, t) and l (s, t) is reversed.

As described above, according to this embodiment, the constraint, that k (s, t) and l (s, t) are both symmetrical with respect to the two axes which pass through the origin and intersect orthogonally, is imposed, in addition to the constraint described in Embodiment 2. Thereby the computing amount and memory consumption of the filter H can be reduced to about ⅛ (about ¼ for the real part and zero for the imaginary part). The method described in this embodiment can be used seamlessly with the method described in Embodiment 1. In this case, the reduction effect of this embodiment can be obtained in addition to the reduction effect described in Embodiment 1. Furthermore, the constraint in this embodiment includes the constraint in Embodiment 4, hence the reduction effect according to Embodiment 4 can be expected as well. ps <Embodiment 6>

Embodiment 6 of the present invention will be described with reference to the drawings.

The configuration of the image generating system, the configuration of the image input apparatus, the hardware configuration and the functional blocks of the image generating apparatus, and the algorithm of the depth control processing are the same as those of Embodiment 3. However, the constraint imposed on the three-dimensional blur function and the specification conditions of the blur effect, that is applied to the reconstructed image, are different.

In this embodiment, in addition to the constraint described in Embodiment 2, constraints are imposed on k (s, t) which determines the shape of the three-dimensional blur function and l (s, t) which determines the new blur shape reflected on the reconstructed image. In concrete terms, rotational symmetry with respect to the origin (s, t)=(0, 0) expressed by the following expression is imposed on k (s, t).

$$k(s \cos \theta − t \sin \theta, s \sin \theta + t \cos \theta) = k(s,t) \quad (29)$$

Here θ denotes the rotation amount centering around the origin in the counterclockwise direction. In this case, the following expression is established for the filter C (derivation process is omitted).

$$C_{s,t}(u\cos\theta - v\sin\theta, u\sin\theta + v\cos\theta) = C_{s\cos\theta + t\sin\theta, s\sin\theta + t\cos\theta}(u,v) \quad (30)$$

Further, rotational symmetry the same as that of k (s, t), expressed by the following expression, is imposed on l (s, t) as a constraint.

$$l(s\cos\theta - t\sin\theta, s\sin\theta + t\cos\theta) = l(s,t) \quad (31)$$

Figure 25:
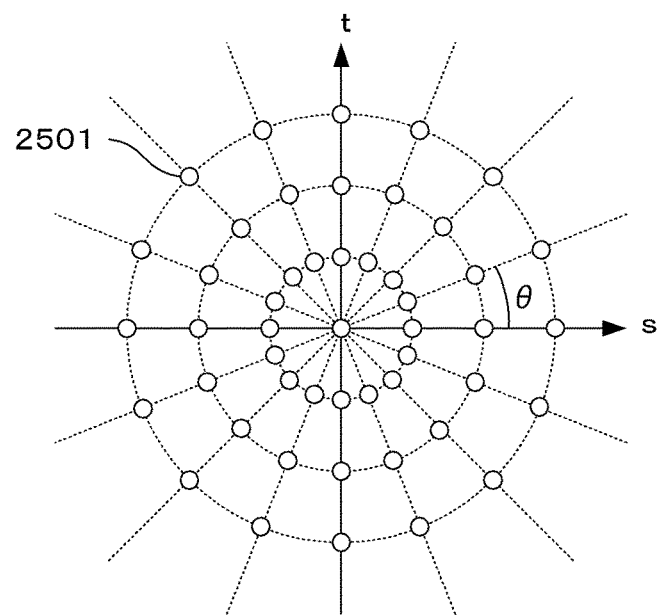
FIG. 25 is a schematic diagram depicting a discretization of an (s, t) coordinate system of Embodiment 6.

To establish the rotational symmetry of Expression (29) to Expression (31) in an actual program, the discrete points in the (s, t) space must have rotational symmetry as well. Therefore in this embodiment, it is preferable to perform discretization using a polar coordinate system as the (s, t) space. FIG. 25 shows a schematic diagram depicting the discretization on the polar coordinate system. In the following description, it is assumed that discretization based on FIG. 25 is used for the discretization of the (s, t) space.

Here if $N_x = N_y = N_0$ assuming that $N_x$ and $N_y$ are equal, then the following expression is derived from Expression (4).

$$H^{(n)}(u\cos\theta - v\sin\theta, u\sin\theta + v\cos\theta) = \quad (32)$$

$$\sum_{s,t} l(s,t)\exp\left(-2\pi i\left(\frac{s(u\cos\theta - v\sin\theta)}{N_0} + \frac{t(u\sin\theta - v\cos\theta)}{N_0}\right)(n - n_f)\right) \times$$

$$C_{s,t}(u\cos\theta - v\sin\theta, u\sin\theta + v\cos\theta)^{-1} =$$

$$\sum_{s,t} l(s,t)\exp\left(-2\pi i\left(\frac{(s\cos\theta + t\sin\theta)u}{N_0} + \frac{(-s\sin\theta + t\cos\theta)v}{N_0}\right)\right)$$

$$(n - n_f)\right) \times C_{s\cos\theta + t\sin\theta, -s\sin\theta + t\cos\theta}(u,v)^{-1} =$$

$$\sum_{s,t} l(s\cos\theta + t\sin\theta, -s\sin\theta + t\cos\theta) \times$$

$$\exp\left(-2\pi i\left(\frac{(s\cos\theta\_t\sin\theta)u}{N_0} + \frac{(-s\sin\theta + t\cos\theta)v}{N_0}\right)(n - n_f)\right) \times$$

$$C_{s\cos\theta + t\sin\theta, -s\sin\theta + t\cos\theta}(u,v)^{-1} = H^{(n)}(u,v)$$

In other words, it is known that the filter $H^{(n)}$ (u, v) is also rotationally symmetrical with respect to the origin (u, v)=(0, 0).

Figure 26:
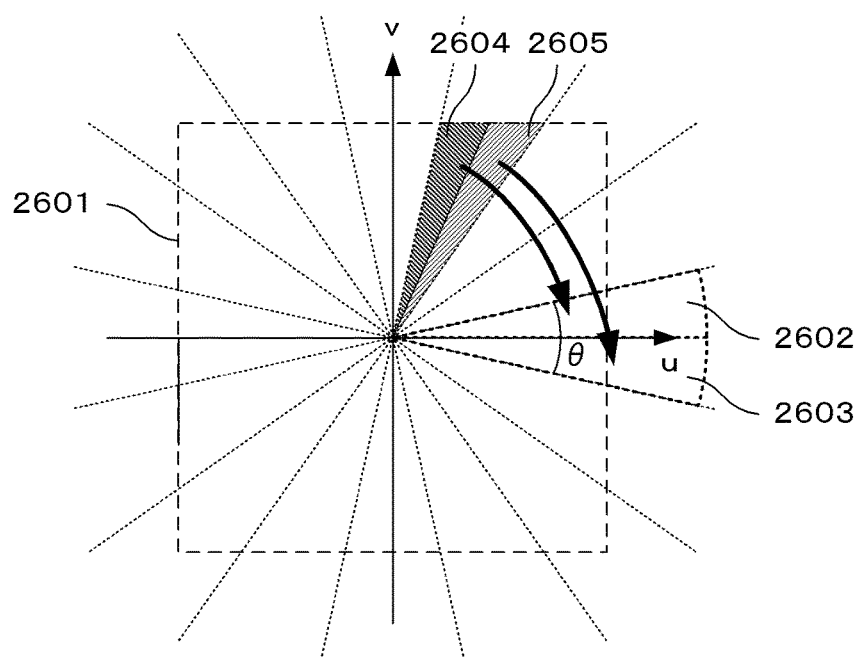
FIG. 26 is a schematic diagram depicting a memory consumption reduction method for a filter H of Embodiment 6.

FIG. 26 is a schematic diagram depicting this image. 2601 denotes a region of the filter $H^{(n)}$ (u, v) when n is fixed to a certain value. 2602 is a region of which data must be stored in memory in advance. 2603 denotes a region of which values can be referred to by inverting region 2602 with respect to the u axis. 2604 denotes a region in which the values of the filter H can be substituted by referring to 2602. 2605 denotes a region in which values of the filter H can be substituted by referring to 2603, that is, by referring to 2602 indirectly. For these references, the coordinate rotation processing is required, hence, compared with 2601, 2602 must have an extra region in the u direction as shown in FIG. 26, and the filter values in the location of the extra region must be calculated in advance. Further, this rotation processing requires coordinate transformation, which means that the computing amount increases accordingly.

If the above processing is performed like this, the computing amount and memory consumption can be reduced to θ/4π at the maximum for the real part. On the other hand, computing and memory are not required at all for the imaginary part, since it is known that the imaginary part is always zero, just like Embodiments 4 and 5. If the (s, t) coordinate system is discretized in an equal interval orthogonal coordinate system, θ becomes θ=π/2, hence the reduction effect obtained in the above processing becomes ⅛ (real part) at the maximum, which is the same as Embodiment 5.

Figure 27:
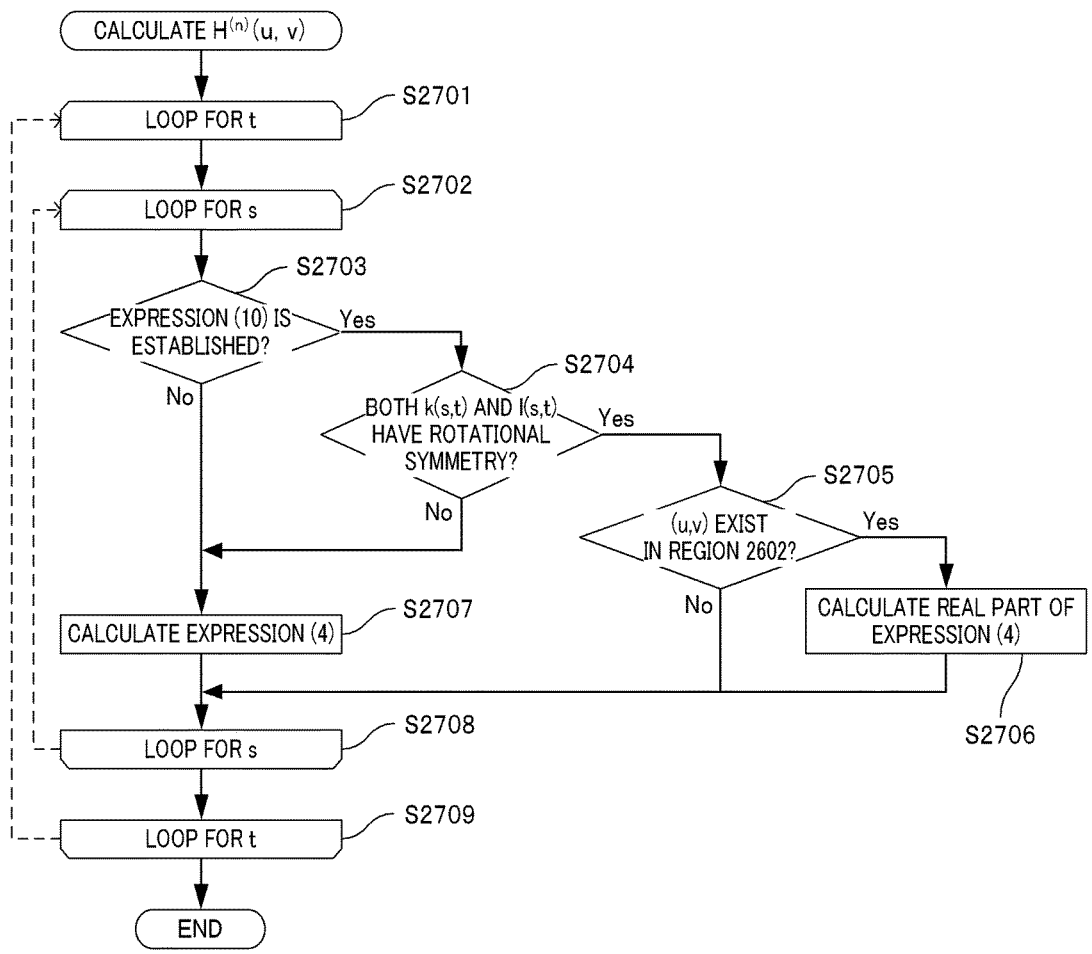
FIG. 27 is a flow chart depicting a flow of a filter H calculating processing of Embodiment 6.

FIG. 27 shows the filter computing amount reduction processing according to this embodiment. In this embodiment, step S804 of FIG. 8 is replaced with the processing operations in steps S2701 to 2709. Only the processing within the double loop on t and s (S2701 to S2709, S2702 to S2708) will be described herein below.

First, the filter calculation unit 405 determines whether Expression (10) is established for the three-dimensional blur function h (x, y, z) (condition determination step S2703). If the determination result of step S2703 is YES, the filter calculation unit 405 determines whether k (s, t) and l (s, t) are both rotationally symmetrical with respect to the origin (condition determination step S2704). If the determination result of step S2704 is YES, the filter calculation unit 405 determines whether (u, v) exists in the region 2602 (condition determination step S2705).

If the determination result of step S2705 is YES, the filter calculation unit 405 executes the calculation of the real part of Expression (4), and stores the result in the storage unit 302 (step S2706). If the determination result of step S2705 is NO, the computing amount can be reduced based on Expression (32), hence the processing operations within the double loop ends here.

If the determination result of step S2703 or step S2704 is NO, the filter calculation unit 405 executes the calculation of Expression (4), and stores the result in the storage unit 302 (step S2707), and the processing operations within the double loop end.

The description on FIG. 27 is now completed.

(Filter H Reference Processing when Convolutional Sum is Calculated)

Figure 28:
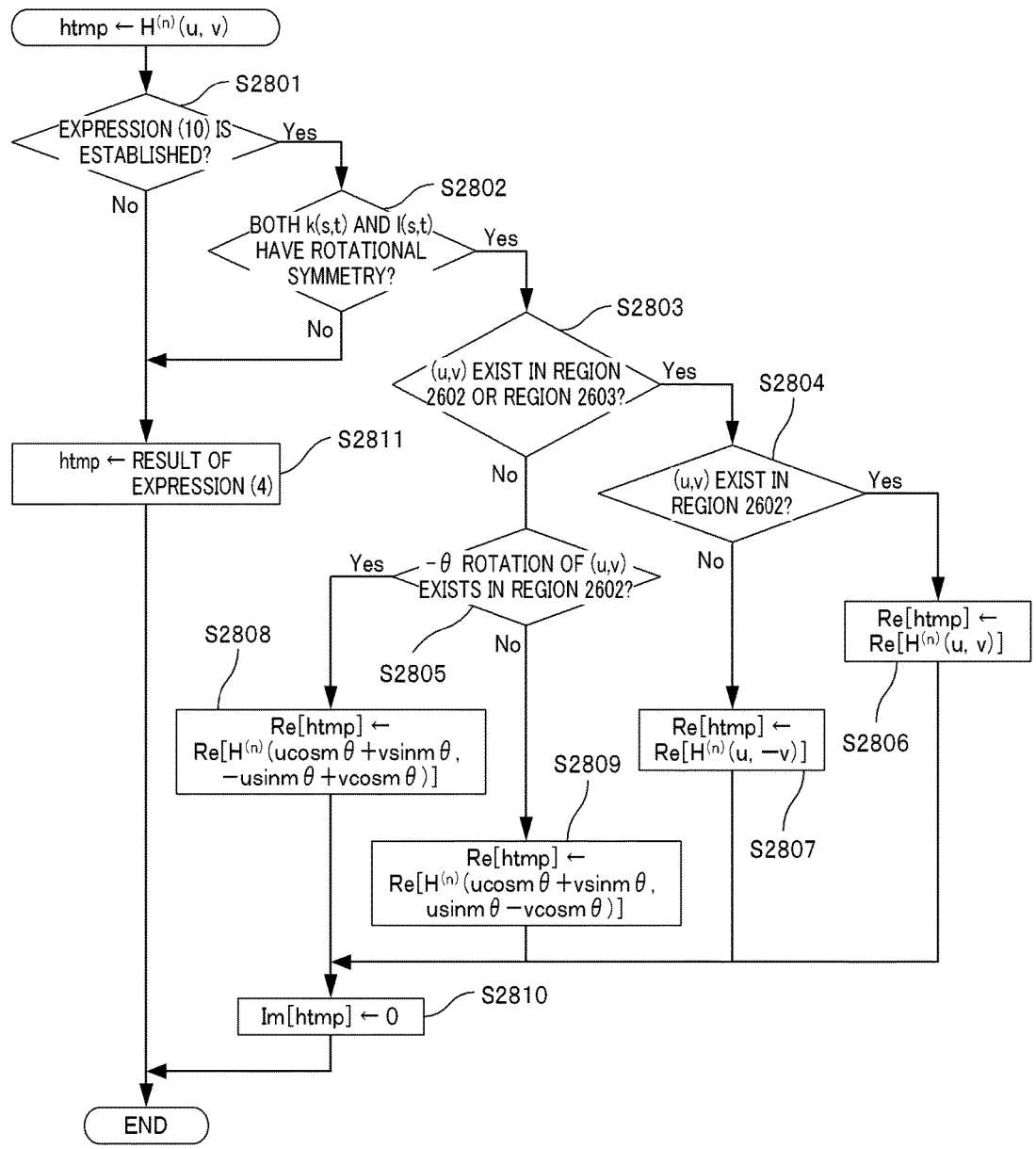
FIG. 28 is a flow chart depicting a flow of a filter H value acquiring processing of Embodiment 6.

FIG. 28 shows the detailed calculation procedure in step S906 when the above mentioned computing amount reduction processing is applied.

First, the convolution unit 406 determines whether Expression (10) is established for the three-dimensional blur function h (x, y, z) (condition determination step S2801). If the result of step S2801 is YES, the convolution unit 406 determines whether k (s, t) and l (s, t) are both rotationally symmetrical with respect to the origin (condition determination step S2802). If the result of step S2802 is YES, the convolution unit 406 determines whether the point (u, v) exists in the region 2602 or 2603 (condition determination step S2803). If the determination result of step S2803 is YES, the convolution unit 406 determines whether the point (u, v) exists in the region 2602 (condition determination step S2804).

If the determination result of step S2804 is YES, the convolution unit 406 acquires the real part of $H^{(n)}$ (u, v) which has already been stored in the storage unit 302, and substitutes the result for the real part of htmp (step S2806). If the determination result of step S2804 is NO, the convolution unit 406 acquires the real part of $H^{(n)}$ (u, −v) which has already been stored in the storage unit 302, and substitutes the result for the real part of htmp (step S2807). If the determination result of step S2803 is NO, the convolution unit 406 determines whether a point, where the point (u, v) is rotated in the −θ direction, exists in the region 2602 (condition determination step S2805).

If the determination result of step S2805 is YES, the convolution unit 406 acquires the real part of $H^{(n)}$ (ucos mθ,+vsin mθ, −usin mθ+vcos mθ) which has already been stored in the storage unit 302, and substitutes the result for the real part of htmp (step S2808). Here m is an integer which is selected so that the point (u, v) enters the region 2602 by the rotating operation. In the case of FIG. 26, for example, m is m=3. If the determination result of step S2805 is NO, the convolution unit 406 acquires the real part of H$^{(n)}$ (ucos mθ+vsin mθ, usin mθ−vcos mθ) which has already been stored in the storage unit 302, and substitutes this result for the real part of htmp (step S2809). After steps S2806, S2807, S2808 and S2809, the convolution unit 406 substitutes zero for the imaginary part of htmp (step S2810), and ends the processing in FIG. 28.

If the determination result of step S2801 or S2802 is NO, the convolution unit 406 acquires the result calculated based on Expression (4) from the storage unit 302, substitutes this result for htmp (step S2811), and ends the processing in FIG. 28.

The description on FIG. 28 is now completed.

As described above, according to this embodiment, the constraint, that k (s, t) and l (s, t) are both rotationally symmetric with respect to the origin, is imposed, in addition to the constraint described in Embodiment 2. Thereby the computing amount and memory consumption of the filter H can be reduced to θ/8π at the maximum (θ/4π for the real part and zero for the imaginary part). The method described in this embodiment can be used seamlessly with the method described in Embodiment 1. In this case, the reduction effect of this embodiment can be obtained in addition to the reduction effect described in Embodiment 1. Furthermore, the constraint in this embodiment includes the constraint in Embodiment 4, hence the reduction effect according to Embodiment 4 can be expected as well.

<Embodiment 7>

(Filter Computing Amount Reduction by Applying Constraint (1))

According to this embodiment, a constraint expressed by the following Expression (33) is imposed on the three-dimensional blur function h (x, y, z) when the depth control method described in NPL 1 is used.

$$h(x,y,z) = \iint k(s,t)\delta(x+sz, y+tz) ds dt \quad (33)$$

Here k (s, t) denotes a coefficient that expresses the weight of a ray group constituting the three-dimensional blur function h (x, y, z), and δ denotes a Dirac delta function. k (s, t) is assumed to satisfy the following expression.

$$\iint k(s,t) ds dt = 1 \quad (34)$$

It is known that h (x, y, z) is given by the following expression based on Expression (33).

$$h(x,y,z) = h(-x,-y,-z) \quad (35)$$

Therefore if the constraint of Expression (33) is imposed, it is known that the three-dimensional blur function h (x, y, z) is point-symmetrical with respect to the focusing position, that is, the origin (x, y, z)=(0, 0, 0).

For the Fourier transform H (u, v, z) of h (x, y, z), it is derived that the symmetry given by the following expression with respect to the origin (u, v, z)=(0, 0, 0) is established if Expressions (2) and (33) are used.

$$H(u,v,z) = H(-u,-v,-z) \quad (36)$$

Moreover, if the real part and the imaginary part of H (u, v, z) are represented by Re [H (u, v, z)] and Im [H (u, v, z)], then it is known that the following expressions are established.

$$Re[H(-u,-v,z)] = Re[H(u,v,z)] \quad (37)$$

$$Im[H(-u,-v,z)] = -Im[H(u,v,z)] \quad (38)$$

When these Expressions (36) to (38) are used and constraints where N is an odd number and z is −(N−1)/2≤z≤ (N−1)/2 (z is an integer) are imposed, all imaginary parts in the expressions are cancelled and become zero when $C_{s,t}$ (u, v) is calculated from Expression (3), if k (s, t) is symmetrical with respect to the origin, therefore Expression (3) can be transformed into the following expression.

$$C_{s,t}(u,v) = \sum_{z=-(N-1)/2}^{(N-1)/2} H(u,v,z)\exp\left(-2\pi i\left(\frac{su}{N_x} + \frac{tv}{N_y}\right)z\right) \quad (39)$$

$$= H(u,v,0) + 2\sum_{z=1}^{(N-1)/2} Re[H(u,v,z)]\cos\left(2\pi\left(\frac{su}{N_x} + \frac{tv}{N_y}\right)z\right)$$

In other words, the computing amount of the real part becomes about half, and the computing amount of the imaginary part becomes zero, hence the computing amount of $C_{s,t}$ (u, v) can be reduced to about ¼ compared with the case of not imposing constraints.

(Filter Computing Amount Reduction by Applying Constraints (2))

If the property of the cos function parts of Expressions (37) and (39) are used as shown in the following expression, $$\cos\left(2\pi\left(\frac{su}{N_x} + \frac{tv}{N_y}\right)z\right) = \cos\left(2\pi\left(\frac{-su}{N_x} + \frac{-tv}{N_y}\right)z\right) \quad (40)$$

it is known that the shape of the filter $C_{s,t}$ (u, v) is symmetrical with respect to the origin regardless the values of s and t, as shown in the following expression.

$$C_{s,t}(u,v) = C_{s,t}(-u,-v) \quad (41)$$

If this is utilized, the computing amount and memory consumption can be reduced for the filter $C_{s,t}$ (u, v) when s and t are fixed to certain values, for example.

Now the array indexes in the u direction and v direction are assumed to be p (p=0, 1, . . . , $N_x$−1) and q (q=0, 1, . . . , $N_y$−1) respectively, and $C_{s,t}$ [p, q] is a real number array having $N_x \times N_y$ number of elements (memory is not required for the imaginary part since the imaginary part is zero). The relationship of u and p is assumed to be u=p if 0≤p<$N_x$/2+1, and u=p−$N_x$ if $N_x$/2+1≤p≤$N_x$−1. In the same manner, the relationship of v and q is assumed to be v=q if 0≤q<$N_y$/2+1, and v=q−$N_y$ if $N_y$/2+1≤q≤$N_y$−1. In this case, the following expression is established based on Expression (41).

$$C_{s,t}[p,q] = \quad (42)$$
$$C_{s,t}[N_x - p, N_y - q]\left(0 \leq p \leq N_x - 1, \frac{N_y}{2} + 1 \leq q \leq N_y - 1\right)$$

Figure 29:
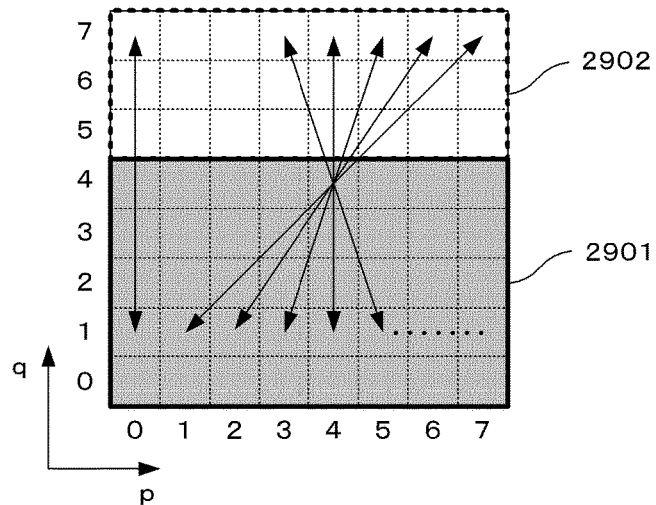
FIG. 29 is a schematic diagram depicting a memory region used for a filter C of Embodiment 7.

Therefore the computing amount and memory consumption required for calculating $C_{s,t}$ [p, q] can be reduced to about ½ (to ½+1/$N_y$ to be more precise). FIG. 29 shows this example. FIG. 29 is a schematic diagram of the memory vision used by the filter $C_{s,t}$ [p, q] when $N_x$=$N_y$=8. The region 2901 enclosed by the solid line is the region that is actually secured in memory, and the region 2902 enclosed by the broken line is a region of which capacity can be reduced by utilizing the above mentioned symmetry. In this example, $N_y$ is $N_y$=8, hence the computing amount and memory consumption can be reduced to ½+⅛=⅝.

This reduction effect does not depend on the values of s and t. Therefore even if the (s, t) coordinate system is divided into $N_s$ in the s direction and into $N_t$ in the t direction, the total memory consumption of the filter C is reduced from $N_x \times N_y 4 \times 2 \times N_s \times N_t$ to $N_x \times (N_y/2+1) \times 4 \times N_s \times N_t$ and becomes about ¼, in comparison with the case of no constraint imposed. Here the filter C is assumed to be a single precision real array. The computing amount is also reduced to about ¼. In this embodiment, reduction is performed in the q direction, but the same reduction can be performed for the p direction without any problem, and the effect obtained in this case is exactly the same. In the case of using a GPU, reduction in the q direction may be preferable due to the characteristics of hardware.

(Summary of Filter Computing Amount Reduction Processing)

Figure 30:
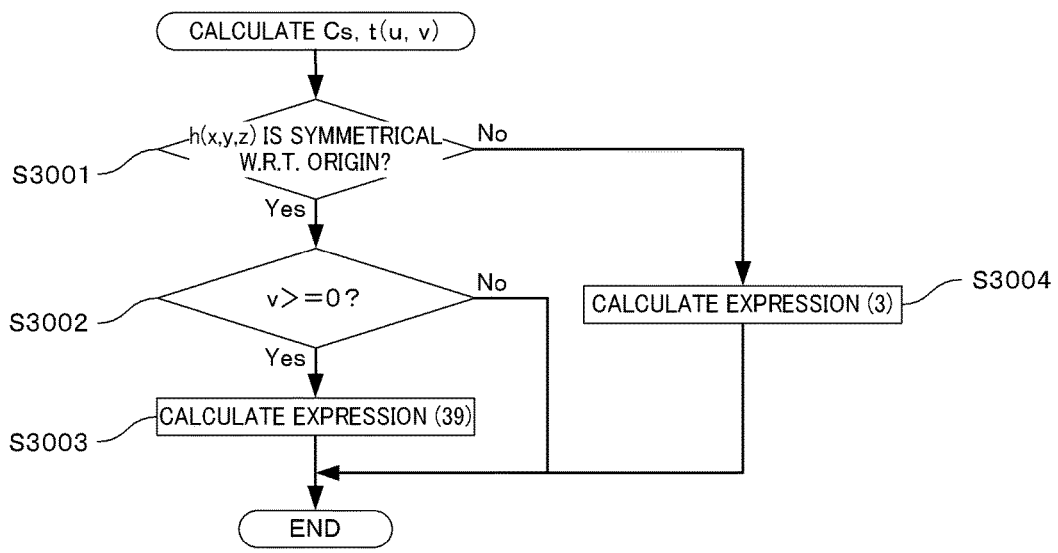
FIG. 30 is a flow chart depicting a flow of a filter C calculating processing of Embodiment 7.

FIG. 30 shows the flow of the filter computing amount reduction processing according to this embodiment described thus far. In this embodiment, step S705 in FIG. 7 is replaced with the processing operations in steps S3001 to S3003.

First, the filter calculation unit 405 determines whether the three-dimensional blur function h (x, y, z) is symmetrical with respect to the origin, that is the focusing position (condition determination step S3001). If the determination result of step S3001 is YES, the filter calculation unit 405 determines whether the value of v is 0 or more (condition determination step S3002). If the determination result of step S3002 is YES, the filter calculation unit 405 executes the calculation of Expression (39) (step S3003). If the determination result of step S3002 is NO, the computing amount can be reduced based on Expression (42), hence the processing in FIG. 30 ends here. If the determination result of step S3001 is NO, the filter calculation unit 405 executes the calculation of Expression (3) (step S3004), and ends the processing in FIG. 30.

The description on FIG. 30 is now completed.

As described above, according to this embodiment, the constraint, that the three-dimensional blur function h (x, y, z) is symmetric with respect to the focusing position, that is the origin, is imposed. Thereby in the calculation of filter $C_{s, t}$ (u, v), the computing amount can be reduced to about ¼ (½ for the real part and zero for the imaginary part), and the memory consumption can be reduced to about ½. Moreover, utilizing that the real part of $C_{s, t}$ (u, v) is symmetrical with respect to the origin (u, v)=(0, 0), the computing amount and memory consumption can be further reduced to about ½. Ultimately the computing amount of the filter C can be reduced to about ⅛ and memory consumption can be reduced to about ¼ compared with the case of no constraint being imposed. By this reduction effect, a desired reconstructed image can be easily generated even if a computer with lower processing performance is used.

<Embodiment 8>

Embodiment 8 of the present invention will be described with reference to the drawings.

The configuration of the image generating system, the configuration of the image input apparatus, the hardware configuration and the functional blocks of the image generating apparatus, and the algorithm of the depth control processing are the same as those of Embodiment 7, but the constraint imposed on the three-dimensional blur function is different.

In this embodiment, it is assumed that k (s, t) is a two-dimensional Gaussian function expressed by the following expression, in addition to the constraint described in Embodiment 7.

$$k(s, t) = \frac{1}{2\pi\sigma^2} \exp\left(-\frac{s^2 + t^2}{2\sigma^2}\right) \quad (43)$$

k (s, t) in this case clearly is rotationally symmetrical with respect to the origin (s, t)=(0, 0). By imposing this constraint, the three-dimensional blur function h (x, y, z) is expressed by the following expression, $$h(x, y, z) = \begin{cases} \frac{1}{z^2} k\left(-\frac{x}{z}, -\frac{y}{z}\right) & (z \neq 0) \\ \delta(x, y) & (z = 0) \end{cases} \quad (44)$$

and is rotationally symmetrical with respect to the origin on an arbitrary xy plane. H (u, v, z), which is a Fourier transform thereof, is also rotationally symmetrical with respect to the origin on an arbitrary uv plane.

Figure 31A:
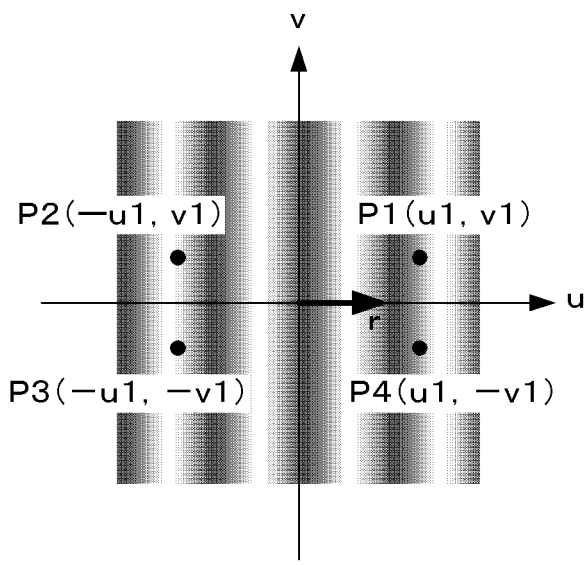
FIGS. 31A and 31B are schematic diagrams depicting cos functions of Embodiment 8.
Figure 31B:
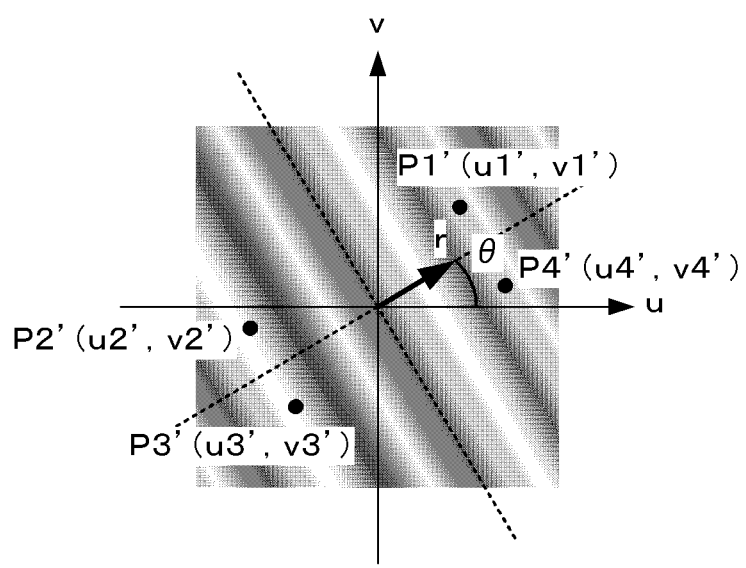

Further, the cos function part of Expression (39) is focused on. This cos function is the same as the cos ($2\pi rz$) which rotated counterclockwise around the origin by θ if tan θ=t/s (it is assumed that r is a magnitude of a vector that is directed in the +u direction from the origin, and satisfies r=(u/$N_x$) cos θ+(v/$N_y$) sin θ). FIGS. 31A and 31B show the schematic diagrams. FIG. 31A is a diagram of cos ($2\pi rz$) before being rotated, and FIG. 31B is a diagram when FIG. 31A is rotated counterclockwise by 0. As FIG. 31A shows, cos ($2\pi rz$) is clearly symmetrical with respect to both the u axis and v axis, and the values of the cos function in P1, P2, P3 and P4 are all the same. If this cos ($2\pi rs$) is rotated counterclockwise by θ, P1 moves to P1', P2 moves to P2', P3 moves to P3', and P4 moves to P4' respectively. Therefore in FIG. 31B, the values of the cos function in P1' to P4' are all the same in FIG. 31B. To be more specific, in the (u, v) space, the cos function part of Expression (39) is symmetrical with respect to two axes: the line v=(t/s)u and the line v=−(s/t)u which intersects with line v=(t/s)u) orthogonally.

Figure 32:
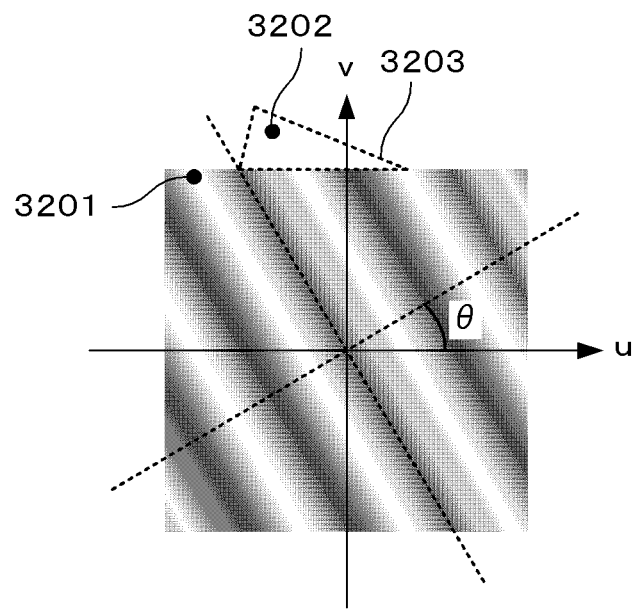
FIG. 32 is a schematic diagram depicting a rotational reference performance of a filter C of Embodiment 8.

Collectively, when k (s, t) is given by Expression (43), the shape of $C_{s, t}$ (u,v) also becomes symmetrical with respect to the two axes: the line v=(t/s)u and the line v=−(s/t)u which intersects with line v=(t/s)u) orthogonally in the (u, v) space, just like the cos function part of Expression (39). If this is utilized when the filter $C_{s, t}$ (u, v) is determined, actual calculation can be limited to a region of v>(t/s)u and of v>−(s/t)u (hereafter this region is called "region 1"), for example. For each value of the filter in other regions, a value of a point in region 1 corresponding to the current (u, v) can be referred to. In this reference, a point corresponding to the current (u, v) may never have existed in region 1. FIG. 32 shows an example of this state. 3201 is a point of which filter value is determined by utilizing a value in region 1 without performing any calculation. 3202, on the other hand, is a point which is axially symmetrical with 3201 and of which filter value has not been calculated. To prevent such a state, when region 1 is calculated, it is necessary to perform calculation for a wider region than normal calculation for region 1. In the case of FIG. 32, the region 3203 enclosed by the broken line corresponds to this extra region.

As described above, according to this embodiment, a constraint, that k (s, t) is rotationally symmetrical, is imposed in addition to the constraint described in Embodiment 7. Thereby the shape of the filter C becomes symmetrical, and as a result, the calculation amount of the filter can be reduced. In concrete terms, if only the filter values in the region of v>(t/s)u and of v>−(s/t)u are calculated, and the values in this region are referred to for the values in other regions, then the computing amount for the real part of $C_{s,t}$ (u, v) can be reduced to ¼ at the maximum. In other words, compared with Embodiment 7, the computing amount becomes ½.

<Embodiment 9>

Embodiment 9 of the present invention will be described with reference to the drawings.

The configuration of the image generating system, the configuration of the image input apparatus, the hardware configuration and the functional blocks of the image generating apparatus, the algorithm of the depth control processing, and the constraint imposed on the three-dimensional blur function are the same as Embodiment 8, but the method for reducing the filter calculation amount is different.

In Embodiment 8, a method for reducing the calculation region of the filter $C_{s,t}$ (u, v) to ¼ at the maximum, when s and t are fixed to certain values, for example, was described. In this embodiment, on the other hand, a method for reducing the calculation amount, by referring to the filter $C_{s',t'}$(u, v) at another (s', t') to determine the values of the filter $C_{s,t}$ (u, v) at a certain (s, t), will be described.

In this embodiment, the values of the filter C are calculated for some discrete points (s, t) at which s>=0 and t=0, and are stored in the storage unit 302 in advance. Then if a filter corresponding to another point (s, t) is required, the value of the filter is determined by rotating the value of the filter C stored in the storage unit 302. For example, filters $C_{s1,0}$ (u, v), $C_{s2,0}$ (u, v) and $C_{s3,0}$ (u, v) corresponding to (s, t)={(s1, 0), (s2, 0) and (s3, 0)} are prepared in the storage unit 302 in advance. Then for (s, t) at which (s, t)=(s1 cos θ, s1 sin θ), for example, the value of the filter $C_{s1\ cos\ \theta,\ s1\ sin\ \theta}$ (u, v) is acquired by rotating $C_{s1,0}$ (u, v) counterclockwise by θ. If this operation is performed, storing only the filter C when s>=0 and t=0 in memory is sufficient. Therefore memory consumption can be reduced considerably, compared to the case when no constraint is imposed on the three-dimensional blur function in particular.

Figure 33:
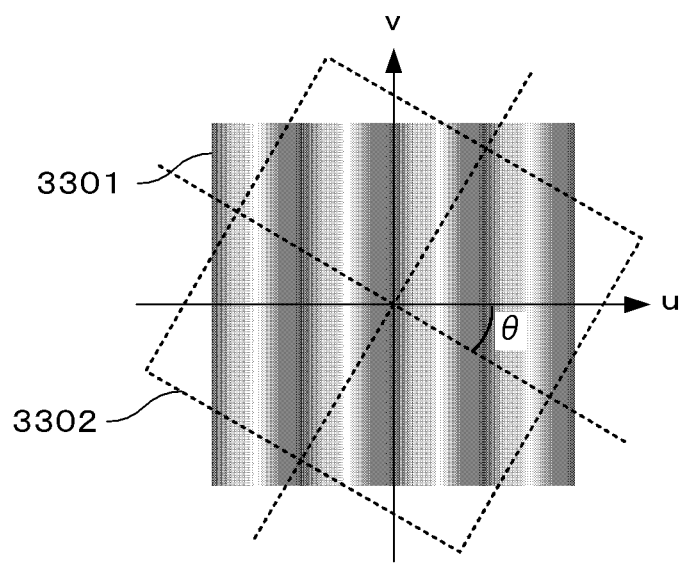
FIG. 33 is a schematic diagram depicting a rotational reference performance of a filter C of Embodiment 9.

Actually, however, a desired filter value may not be referred to merely by performing the rotation operation, depending on the value of (u, v). FIG. 33 shows an example of this state. 3301 is a filter value of the reference source. 3302, on the other hand, is a region of the filter of which value is determined simply by rotating the reference source, omitting actual calculation. In the example shown in FIG. 33, 3301 does not completely cover the region required by 3302. Therefore in this case, the region of 3301 must be expanded so that the 3302 region is completely covered.

Figure 34:
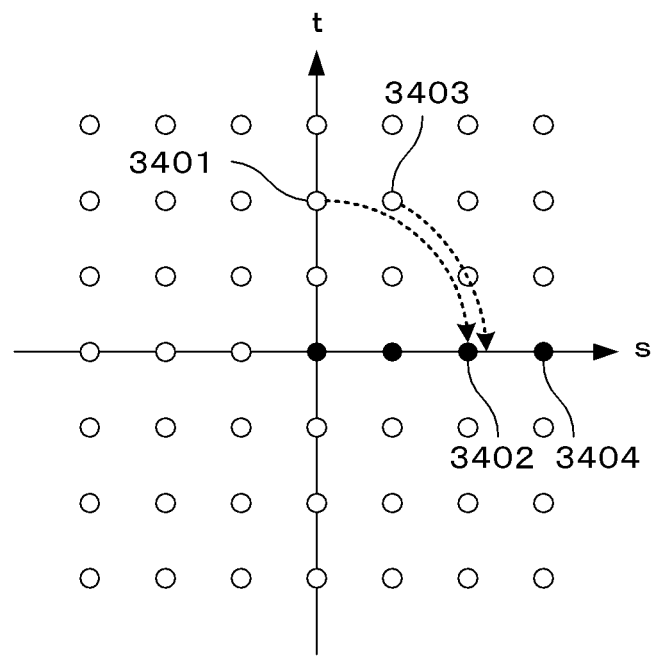
FIG. 34 is a schematic diagram depicting a rotational reference performance of discrete points of Embodiment 9.

Further, depending on the way of discretization in the (s, t) space, the value of (s, t) may not satisfy the relationship of (s, t) =(s1 cos θ, s1 sin θ). FIG. 34 shows an example of this state. In FIG. 34, the (s, t) space is discretized to 49 points. A black dot in FIG. 34 is a point which has the real data of the filter as the reference source, and a white circle is a point which does not have the real data of the filter, and for which the real data is substituted by referring to a discrete point. The discrete point 3401 can be matched with the discrete point 3402 by being rotated around the origin (s, t)=(0, 0) by −90°. Hence in this case, the filter data of the discrete point 3402, which has already been provided as the filter data corresponding to the discrete point 3401, can be used. For the discrete point 3403, however, the filter data provided in advance cannot be used, because the corresponding discrete point does not exist on the s axis even if the discrete point 3403 is rotated. An example of the processing that is required in this case is using the filter data corresponding to the discrete point 3402 and the filter data corresponding to the discrete point 3404, interpolation is performed for all of (u, v), and the result is regarded as the filter data corresponding to this discrete point 3403. In this case, however, errors are generated by interpolation, therefore a lot of filter data must be prepared in advance to minimize these errors.

Figure 35:
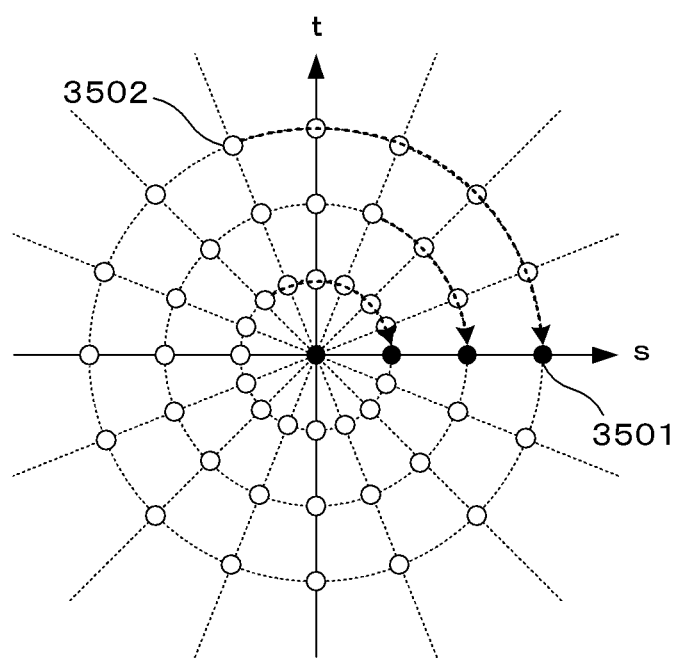
FIG. 35 is a schematic diagram depicting a polar coordinate discretization of a (s, t) space of Embodiment 9.

An alternative is discretizing the (s, t) space on the polar coordinate system. If the discrete points are arranged on concentric circles at equal angles, with the origin at the center, as shown in FIG. 35, then the above mentioned problem, where a discrete point to be referred to does not exist, is not generated. For example, for the filter data corresponding to the discrete point 3502, the filter data of the discrete point 3501 can be used. In the example in FIG. 35, the discrete points of which distance from the origin are the same, can all be matched with the discrete points on the s axis indicated by black dots, by rotation operation. In this case, the computing amount and memory consumption for the filter calculation can be reduced to about 1/16 at the maximum. However, the actual computing amount is slightly higher since the computing for coordinate rotation to refer the filter data is now required.

As described above, according to this embodiment, a constraint, that k (s, t) is rotationally symmetrical, is imposed in addition to the constraint described in Embodiment 7. Thereby a number of filters C to be generated is decreased, and as a result, the computing amount and memory consumption of the filter can be reduced. In concrete terms, if (s, t) is s>=0 and t=0, the filter data is generated and stored in the memory, and for other (s, t), the filter data stored in memory is rotated and used as the filter. When this embodiment is used, it is preferable to perform discretization in the (s, t) space using the polar coordinate system, as described in FIG. 35. In this case, if the division unit in the rotation direction is θ[rad], the computing amount and memory consumption are reduced to θ/2π at the maximum.

<Embodiment 10>

Embodiment 10 of the present invention will be described with reference to the drawings.

The configuration of the image generating system, the configuration of the image input apparatus, the hardware configuration and the functional blocks of the image generating apparatus, the algorithm of the depth control processing, and the constraint imposed on the three-dimensional blur function are the same as Embodiment 9, but the method for reducing the filter calculation amount is different.

In Embodiment 9, a method for calculating the filter $C_{s,t}$ (u, v) only for a limited (s, t) and using the already calculated filter $C_{s,t}$ (u, v) for the other (s, t) by rotating, was described. However, as mentioned above, this method cannot be applied very well if the (s, t) space is discretized in an equal interval orthogonal coordinate system. Further, if this method is used for a high-speed processor, such as a GPU, the calculation speed may drop considerably due to the architectural constraints of the system. With this in view, in this embodiment a method in which the computing amount and memory consumption can be reduced without problem, even if the (s, t) space is discretized in the equal interval orthogonal coordinate system, and in which compatibility with GPU is also high, will be described.

Figure 36:
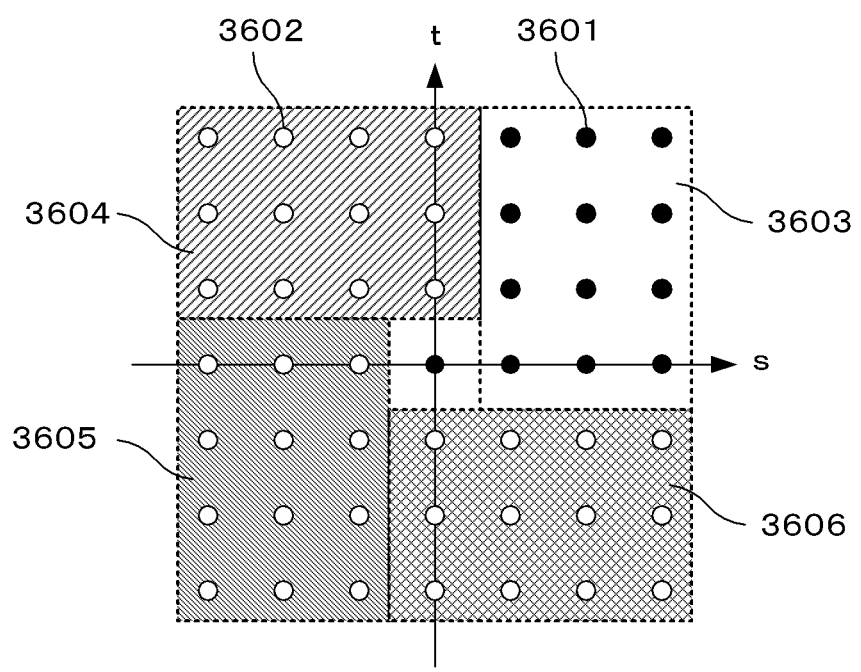
FIG. 36 is a schematic diagram depicting a rotational reference performance of discrete points of Embodiment 10.

FIG. 36 shows the concept of this embodiment. Just like FIGS. 34 and 35, a discrete point 3601, indicated by a black dot, is a point which has filer data, and a discrete point 3602 indicated by a white circle is a point which has no filer data. The region 3603 is a region that is always referred to by other regions. For example, each discrete point belonging to the region 3604 all match with any one of the discrete points belonging to the region 3603, if the point is rotated −90° with respect to the origin (s, t)=(0, 0). In other words, for (s, t) belonging to the region 3604, the filter data corresponding to discrete points belonging to the region 3603 perfectly matches with the shape of the filter C, which is determined for the discrete points belonging to the region 3604, if this filter data is, rotated 90° in the (u, v) space. In the same manner, for (s, t) belonging to the region 3605, the filter data corresponding to the discrete points belonging to the region 3603 can be rotated 180° in the (u, v) space. For (s, t) belonging to the region 3606, the filter data can be rotated 270° in the (u, v) space. Further, if the origin symmetry expression (37) of $C_{s,t}$ (u, v) described in Embodiment 7 is considered, even the rotation operation is unnecessary for (s, t) belonging to the region 3605. This relationship is also established for the region 3604 and the region 3606.

If the above method is used, the computing amount and memory consumption of all the filters $C_{s,t}$ (u, v) can be reduced to about ¼.

If this embodiment is used for a GPU, the above mentioned 90° rotating processing may become a bottleneck. Therefore to ensure a high-speed computing performance of a GPU, it is preferable to provide the real data of the filter C not only for the region 3603 but also for the region 3604. Then the filer data of the region 3603 can be used for the region 3605 without performing the rotating operation, and the filer data of the region 3604 can also be used for the region 3606 without performing the rotating operation. This makes it completely unnecessary to perform the rotating operation of file data. Instead, in this case, the computing amount and memory consumption can be reduced only to about ½.

As described above, according to this embodiment, a number of filters $C_{s,t}$ (u, v) to be generated can be decreased, even if the (s, t) space is discretized in the equal interval orthogonal coordinate system, whereby the computing amount and memory consumption of the filter can be reduced. In concrete terms, if (s, t) belongs to the region 3603, the filter data is generated and stored in memory in advance, and for the other (s, t), the filter data stored in memory is rotated and used as the filter. Thereby the computing amount and memory consumption of the filter C can be reduced to about ¼. If high-speed computing is performed by a GPU, it is preferable that the file data is generated and stored in memory only when (s, t) belongs to the region 3603 and the region 3604. In this case, however, the computing amount and memory consumption are reduced only to about ½. The method described in this embodiment can be used seamlessly with the method described in Embodiment 7. In this case, the computing amount and memory consumption can be reduced further.

<Embodiment 11>

Embodiment 11 of the present invention will be described with reference to the drawings.

The configuration of the image generating system, the hardware configuration and the functional blocks of the image generating apparatus, and the algorithm of the depth control processing are the same as those of Embodiment 7, but the configuration of the image input apparatus and the constraint imposed on the three-dimensional blur function are different.

In this embodiment, the image input apparatus 101 having the configuration shown in FIG. 14 is used. Description on the configuration of the image input apparatus 101, which was described in Embodiment 3, is omitted here.

In this embodiment, in addition to the constraint described in Embodiment 7, a constraint, that k (s, t) is symmetrical with respect to an arbitrary axis, is set. For example, the constraint of this embodiment is a case when the shape of the diaphragm 1403 is a pentagon and is symmetrical with respect to the t axis, as shown in FIG. 15. In the case of a standard digital camera, the shape of the diaphragm is determined by a number of diaphragm blades, hence if the number of diaphragm blades is 5, then the shape of the diaphragm is a pentagon.

To implement this constraint in k (s, t), the arrangement of discrete points 1501 in the (s, t) space must be symmetrical with respect to at least the t axis, and the values defined for the discrete points 1501 must also be symmetrical with respect to the t axis, and must be values that appropriately represent the shape of the diaphragm 1403. A possible method for representing the shape by values is setting the values inside the diaphragm 1403 to constants and all the values outside the diaphragm 1403 to zero, for example. If these values are multiplied by a two-dimensional Gaussian function centering around the origin, the representation becomes even closer to the actual shape. It is preferable to perform normalization in advance, such as making the sum of k (s, t) values in all of (s, t) to 1.

If k (s, t) that is symmetrical with respect to the t axis is used, for example, as mentioned above, the following expression is established, $$k(s,t)=k(-s,t) \quad (45)$$

hence the following expression is established based on Expressions (45) and (33), $$h(x,y,z)=h(-x,y,z) \quad (46)$$

whereby it is known that the three-dimensional blur function h (x, y, z) also becomes symmetric with respect to the y axis. In this case, it is known that the following expression is established based on Expression (2), $$H(u,v,z)=H(-u,v,z) \quad (47)$$

and if this Expressions (47) and (39) are used, the following expression is established.

$$C_{-s,t}(u,v)=C_{s,t}(-u,v) \quad (48)$$

If the filter $C_{s',t'}$ (u, v) at a certain s' (s'>=0) and t' is held using this Expression (48), then the filter data corresponding to a negative s coordinate can be acquired merely by inverting the u coordinate of the filter $C_{s',t'}$(u, v). In other words, the computing amount and memory consumption of the filter C can be reduced to about ½ at the maximum.

In the above example, k (s, t) is symmetrical with respect to the t axis, but if k (s, t) is symmetrical with respect to the s axis, the same reduction effect can be obtained by inverting the v coordinate of the filter C. In theory, if k (s, t) is symmetrical with respect to one arbitrary axis passing through the origin, and not limited to the s axis or t axis, then the computing amount and memory consumption can be reduced in the same manner by appropriately performing coordinate inversion for (u, v). However, even in such a case, it is preferable in a practical sense that the symmetrical axis is set to the s axis or t axis by appropriately rotating the coordinate axis, since processing becomes easier.

As described above, according to this embodiment, the constraint, that k (s, t) is symmetrical with respect to an arbitrary axis passing through the origin, is imposed in addition to the constraint described in Embodiment 7. Thereby the computing amount and memory consumption of the filter C can be reduced to about ½ at the maximum.

In this case, however, an appropriate inversion of the (u, v) coordinate must be performed. The method described in this embodiment can be used seamlessly with the method described in Embodiment 7. In this case, the reduction effect by this embodiment can be obtained in addition to the reduction effect described in Embodiment 7.

<Embodiment 12>

Embodiment 12 of the present invention will be described with reference to the drawings.

The configuration of the image generating system, the configuration of the input apparatus, the hardware configuration and the functional blocks of the image generating apparatus, and the algorithm of the depth control processing are the same as those of Embodiment 11, but the constraint imposed on the three-dimensional blur function is different.

In this embodiment, instead of the constraint described in Embodiment 11, a constraint, that the shape of k (s, t) is symmetrical with respect to the origin, is set. For example, the constraint of this embodiment is a case when the shape of the diaphragm 1403 is a parallelogram, as shown in FIG. 20. This is expressed by the following expression.

$$k(s,t)=k(-s,-t) \quad (49)$$

However, similarly to Embodiment 11 it is necessary that discretization of the (s, t) space is also symmetrical with respect to the origin, and the value defined thereon is symmetrical with respect to the origin as well. In this case, the following expression is established, $$h(x,y,z)=h(-x,-y,z) \quad (50)$$

and the three-dimensional blur function h (x, y, z) also becomes symmetrical with an arbitrary xy plane with respect to the origin. In this case, the following expression is established based on Expression (2), $$H(-u,-v,z)=H(u,v,z) \quad (51)$$

hence, using this Expressions (51) and (39), the following expression is established.

$$C_{-s,-t}(u,v)=C_{s,t}(-u,-v) \quad (52)$$

However, since the shape of the filter C is symmetrical with respect to the origin (Expression (41)), the following expression is established.

$$C_{-s,-t}(u,v)=C_{s,t}(u,v) \quad (53)$$

If the filter $C_{s', t'}$ (u, v) at a certain s' (s'>=0) and t' is held using this Expression (53), then the filter data corresponding to a negative s coordinate can be acquired merely by referring to the filter $C_{s', t'}$ (u, v). In other words, the computing amount and memory consumption of the filter C can be reduced to about ½ at the maximum. In this case, the coordinate inversion processing described in Embodiment 11 or the like is not required.

As described above, according to this embodiment, the constraint, that k (s, t) is symmetrical with respect to the origin, is imposed in addition to the constraint described in Embodiment 7. Thereby the computing amount and memory consumption of the filter $C_{s, t}$ (u, v) can be reduced to about ½ at the maximum. The method described in this embodiment can be used seamlessly with the method described in Embodiment 7. In this case, the reduction effect by this embodiment can be obtained in addition to the reduction effect described in Embodiment 7.

<Embodiment 13>

Embodiment 13 of the present invention will be described with reference to the drawings.

The configuration of the image generating system, the configuration of the image input apparatus, the hardware configuration and the functional blocks of the image generating apparatus, and the algorithm of the depth control processing are the same as those of Embodiment 11, but the constraint imposed on the three-dimensional blur function is different.

In this embodiment, instead of the constraint described in Embodiment 11, a constraint, that k (s, t) is symmetrical with respect to two arbitrary axes, is set. For example, the constraint of this embodiment is a case when a shape of the diaphragm 1403 is a hexagon, and is symmetrical with respect to the s axis and t axis, as shown in FIG. 16. In the case of a standard digital camera, the shape of the diaphragm is a hexagon if a number of diaphragm blades is 6.

If k (s, t) that is symmetrical with respect to the s axis and t axis is used, as mentioned above, the following expression is established.

$$k(s,t)=k(-s,t)=k(s,-t)=k(-s,-t) \quad (54)$$

In this case, just like Embodiment 11, it is necessary that the discrete points 1601 in the (s, t) space are also symmetrical with respect to the s axis and t axis, and the values defined thereon must be symmetrical with respect to the s axis and t axis as well. If this Expressions (54) and (33) are used, the following expression is established, $$h(x,y,z)=h(-x,y,z)=h(x,-y,z)=h(-x,-y,z) \quad (55)$$

whereby it is known that the three-dimensional blur function h (x, y, z) also becomes symmetrical with respect to the x axis and y axis. In this case, the following Expression (56) is established based on Expression (2), $$H(-u,v,z)=H(u,-v,z)=H(-u,-v,z)=H(u,v,z) \quad (56)$$

hence using this Expressions (56) and (39), the following expression is established.

$$C_{s,t}(u,v)=C_{-s,t}(-u,v)=C_{s,-t}(u,-v)=C_{-s,-t}(-u,-v)=C_{-s,-t}(u,v) \quad (57)$$

If this property is used, it is sufficient that the filter $C_{s', t'}$ (u, v) at a certain s' and t' (s'>=0, t'>=0) is held. Then the filter data corresponding to a positive s coordinate and negative t coordinate, or negative s coordinate and positive t coordinate, can be acquired merely by inverting the u coordinate or v coordinate of the filter $C_{s', t'}$ (u, v). The filter data corresponding to a negative s coordinate and a negative t coordinate can be acquired by directly referring to the filter $C_{s', t'}$ (u, v). In other words, the computing amount and memory consumption of the filter C can be reduced to about ¼ at the maximum.

In the above example, k (s, t) is symmetrical with respect to the s axis and t axis, but in theory, if k (s, t) is symmetrical with respect to two arbitrary axes passing through the origin, then the computing amount and memory consumption can be reduced in the same manner by appropriately performing coordinate inversion for (u, v). However, even in such a case, it is preferable in a practical sense that symmetrical axes are set to the s axis and t axis, by appropriately rotating the coordinate axis, since the processing becomes easier.

As described above, according to this embodiment, the constraint, that k (s, t) is symmetrical with respect to two arbitrary axes passing through the origin, is imposed in addition to the constraint described in Embodiment 7. Thereby the computing amount and memory consumption of the filter C can be reduced to about ¼ at the maximum. In this case, however, appropriate inversion of the (u, v) coordinate must be performed. The method described in this embodiment can be used seamlessly with the method described in Embodiment 7. In this case, the reduction effect by this embodiment can be obtained in addition to the reduction effect described in Embodiment 7.

<Other Embodiments>

The embodiments described above are merely examples of carrying out the present invention, and are not intended to limit the scope of the invention.

For example, the computing amount reduction methods for the filter H described in Embodiments 1 to 6 and the computing amount reduction methods for the filter C described in Embodiments 7 to 13 may be appropriately combined. Further, the computing reduction methods for the filter H described in Embodiments 1 to 6 may be combined with each other, or the computing reduction methods for the filter C described in Embodiments 7 to 13 may be combined with each other unless a technical or mathematical inconsistency is generated. By combining a plurality of methods, an even higher reduction effect can be obtained.

In each embodiment described above, the present invention is applied to the algorithm of NPL1, but the present invention can also be suitably applied to other algorithms if the algorithm uses a spatial frequency filter based on the three-dimensional blur function of an imaging optical system. For example, in the algorithm disclosed in NPL2, a view point image related to a desired ray (in view point direction) is acquired by using a ray separation filter C for a Fourier-transformed defocused image group. By applying the method described in Embodiments 7 to 13 to the processing for generating this ray separation filter C, the same effect can be obtained.

The above mentioned image processing apparatus can be implemented either by software (a program) or by hardware. For example, a computer program may be stored in a memory of a computer (e.g. microcomputer, CPU, MPU, FPGA) embedded in an image processing apparatus, and each processing may be implemented by causing the computer to execute this computer program. It is also preferable to install a dedicated processor, such as an ASIC, which implements some or all of the processing operations of the present invention using a logic circuit. The present invention can also be applied to a server in a cloud environment.

Furthermore, the present invention can be carried out, for example through a method constituted by steps in which a system or a computer of an apparatus implements the functions of the embodiments described above by reading and executing a program recorded in a storage device. For this purpose, this program is provided to the computer through a network or various types of recording media (non-transitory computer readable recording media for holding data) that plays the role of the storage device, for example. Therefore the above mentioned computer (including such a device as a CPU and MPU), the above mentioned method, the above mentioned program (including program codes and program products) and the above mentioned non-transitory computer readable recording media for holding data are all included within the scope of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-136287, filed on Jul. 7, 2015, which is hereby incorporated by reference herein in its entirety.

What is claimed is:

1. An image generating apparatus, comprising:
an input unit configured to input data on a defocused image group constituted by a plurality of images acquired by imaging an object for a plurality of times while changing a focal position in an optical axis direction of an imaging optical system;
a storage unit configured to store data on a plurality of filters generated on the basis of a three-dimensional blur function for approximating a blur characteristic of the imaging optical system; and
a computing unit configured to acquire data on a filter to be used from the storage unit and to generate a new image by applying the filter to the defocused image group, wherein
when a first element of a first filter out of the plurality of filters is symmetrical or anti-symmetrical with a second element included in the first filter or a second filter, which is different from the first filter, the storage unit does not store the data on the first element of the first filter, and the computing unit generates the data on the first element of the first filter on the basis of data on the second element which is stored in the storage unit when the first filter is used.

2. The image generating apparatus according to claim 1, further comprising a filter calculation unit that generates the plurality of filters on the basis of the three-dimensional blur function and stores the filters in the storage unit, wherein
the filter calculation unit does not calculate the first element of the first filter.

3. The image generating apparatus according to claim 2, wherein
the plurality of filters are a plurality of blur reconstruction filters that are applied to respective images corresponding to respective focal positions constituting the defocused image group, in order to reconstruct an image having a new blur from the defocused image group.

4. The image generating apparatus according to claim 3, wherein
the first filter is a filter to be applied to an image corresponding to a first focal position,
the second filter is a filter to be applied to an image corresponding to a second focal position that is located in a position symmetrical with the first focal position with respect to a focusing position, and the second element is an element of the second filter and is an element located in a same position as the first element in a coordinate system of the filter.

5. The image generating apparatus according to claim 3, wherein
the three-dimensional blur function is a function that has point symmetry with respect to a focusing position, and is expressed by a set of plurality of rays that pass through the focusing position, and
the second element is an element of the first filter and is an element located in a position that is point-symmetric with the first element in a coordinate system of the filter.

6. The image generating apparatus according to claim 5, wherein
both a shape of the three-dimensional blur function and a shape of the new blur applied to an image reconstructed by the blur reconstruction filter have axial symmetry with respect to a same symmetrical axis in a two-dimensional coordinate system on a plane perpendicular to an optical axis direction, and
the second element is an element of the first filter, and is an element located in a position that is axially symmetrical with the first element in the coordinate system of the filter.

7. The image generating apparatus according to claim 5, wherein
both a shape of the three-dimensional blur function and a shape of the new blur applied to an image reconstructed by the blur reconstruction filter have point-symmetry with respect to an origin in a two-dimensional coordinate system on a plane perpendicular to an optical axis direction, and
the filter calculation unit does not calculate an imaginary part of elements of the plurality of filters.

8. The image generating apparatus according to claim 5, wherein
both a shape of the three-dimensional blur function and a shape of the new blur applied to an image reconstructed by the blur reconstruction filter have point-symmetry with respect to an origin in a two-dimensional coordinate system on a plane perpendicular to an optical axis direction, and
the storage unit does not store the data on an imaginary part of elements of the plurality of filters.

9. The image generating apparatus according to claim 5, wherein
a shape of the three-dimensional blur function has axial symmetry with respect to two symmetric axes intersecting orthogonally in a two-dimensional coordinate system on a plane perpendicular to an optical axis direction, and a shape of the new blur applied to an image reconstructed by the blur reconstruction filter also has axial symmetry with respect to each of the two symmetrical axes, and
the second element is an element of the first filter and is an element located in a position that is axially symmetrical with the first element in the coordinate system of the filter.

10. The image generating apparatus according to claim 5, wherein
both a shape of the three-dimensional blur function and a shape of the new blur applied to an image constructed by the blur reconstruction filter have rotational symmetry with respect to an origin in a two-dimensional coordinate system on a plane perpendicular to an optical axis direction, and the second element is an element of the first filter, and is an element located in a position where the first element is rotated around the origin in the coordinate system of the filter.

11. The image generating apparatus according to claim 2, wherein
the plurality of filters are a plurality of ray separating filters corresponding to a plurality of view points respectively, for extracting information on a ray passing through each view point from the defocused image group.

12. The image generating apparatus according to claim 11, wherein
the three-dimensional blur function is a function that has point symmetry with respect to a focusing position and is expressed by a set of a plurality of rays that pass through the focusing position, and
the filter calculation unit does not calculate an imaginary part of elements of the plurality of filters.

13. The image generating apparatus according to claim 12, wherein
the second element is an element of the first filter, and is an element located in a position that is point-symmetrical with the first element in a coordinate system of the filter.

14. The image generating apparatus according to claim 12, wherein
a shape of the three-dimensional blur function has rotational symmetry with respect to an origin in a two-dimensional coordinate system on a plane perpendicular to an optical axis direction, and
the second element is an element of the first filter, and is an element located in a position that is axially symmetrical with the first element in the coordinate system of the filter.

15. The image generating apparatus according to claim 12, wherein
a shape of the three-dimensional blur function has rotational symmetry with respect to an origin in a two-dimensional coordinate system on a plane perpendicular to an optical axis direction, and
the second element is an element of the first filter, and is an element located in a position where the first element is rotated around the origin in a coordinate system of the filter.

16. The image generating apparatus according to claim 12, wherein
a shape of the three-dimensional blur function has axial symmetry on a two-dimensional coordinate system on a plane perpendicular to an optical axis direction, and
the second element is an element of the first filter, and is an element located in a position axially symmetrical with the first element in a coordinate system of the filter.

17. The image generating apparatus according to claim 12, wherein
a shape of the three-dimensional blur function has point symmetry with respect to an origin in a two-dimensional coordinate system on a plane perpendicular to an optical axis direction, and
the second element is an element of the first filter, and is an element located in a position that is point-symmetrical with the first element with respect to the origin in a coordinate system of the filter.

18. The image generating apparatus according to claim 12, wherein
- a shape of the three-dimensional blur function has axial symmetry with respect to each of two symmetrical axes intersecting orthogonally in a two-dimensional coordinate system on a plane perpendicular to an optical axis direction, and
- the second element is an element of the first filter, and an element located in a position that is axially symmetrical with the first element in a coordinate system of the filter.

19. An image generating method, comprising:
- a step in which a computer inputs data on a defocused image group constituted by a plurality of images acquired by imaging an object for a plurality of times while changing a focal position in an optical axis direction of an imaging optical system; and
- a computing step in which the computer acquires data on a filter to be used from a storage unit, which stores data on a plurality of filters generated on the basis of a three-dimensional blur function for approximating a blur characteristic of the imaging optical system, and generates a new image by applying the filter to the defocused image group, wherein
- when a first element of a first filter out of the plurality of filters is symmetrical or anti-symmetrical with a second element that is included in the first filter or a second filter, which is different from the first filter, the storage unit does not store the data on the first element of the first filter, and in the computing step, the data on the first element of the first filter is generated on the basis of data on the second element, which is stored in the storage unit, when the first filter is used.

20. A non-transitory computer readable storage medium storing a program causing a computer to execute:
- a step of inputting data on a defocused image group constituted by a plurality of images acquired by imaging an object for a plurality of times while changing a focal position in an optical axis direction of an imaging optical system; and
- a computing step of acquiring data on a filter to be used from a storage unit storing data on a plurality of filters generated on the basis of a three-dimensional blur function for approximating a blur characteristic of the imaging optical system, and generating a new image by applying the filter to the defocused image group, wherein
- when a first element of a first filter out of the plurality of filters is symmetrical or anti-symmetrical with a second element included in the first filter or a second filter, which is different from the first filter, the storage unit does not store the data on the first element of the first filter, and in the computing step, the data on the first element of the first filter is generated on the basis of data on the second element, which is stored in the storage unit, when the first filter is used.

* * * * *